(12) United States Patent
Patel et al.

(10) Patent No.: US 12,015,174 B1
(45) Date of Patent: Jun. 18, 2024

(54) INTERFACE FOR A CURRENT COLLECTOR AND A BUSBAR

(71) Applicant: Rivian IP Holdings, LLC, Plymouth, MI (US)

(72) Inventors: Neil Patel, Costa Mesa, CA (US); Tyler Jacobs, Redondo Beach, CA (US); James Daisuke Spence, Ontario, CA (US); Karthik Gundappa Balte, Laguna Niguel, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/067,771

(22) Filed: Dec. 19, 2022

(51) Int. Cl.
*H01M 50/516* (2021.01)
*B60L 50/64* (2019.01)
*H01M 50/204* (2021.01)
*H01M 50/507* (2021.01)

(52) U.S. Cl.
CPC ........... *H01M 50/516* (2021.01); *B60L 50/64* (2019.02); *H01M 50/204* (2021.01); *H01M 50/507* (2021.01); *H01M 2220/20* (2013.01)

(58) Field of Classification Search
CPC ............. H01M 50/516; H01M 50/507; H01M 50/204; H01M 2220/20
See application file for complete search history.

(56) References Cited

U.S. PATENT DOCUMENTS

| 2019/0081370 A1* | 3/2019 | Capati | H01M 50/284 |
| 2020/0152936 A1* | 5/2020 | Wynn | H01M 50/522 |

* cited by examiner

*Primary Examiner* — Jane J Rhee
(74) *Attorney, Agent, or Firm* — Foley & Lardner LLP

(57) ABSTRACT

A battery module of a battery pack of an electric vehicle can include a current collector of a battery, a busbar of the battery and an interface component to electrically couple the current collector and the busbar. The interface component can be electrically coupled with the current collector or be an integral part of a metal layer of the current collector. The interface component can be curved about an edge of the busbar. The interface component can be coupled with the busbar via a first weld at a region of the busbar.

20 Claims, 16 Drawing Sheets

INTERFACE FOR A CURRENT COLLECTOR AND A BUSBAR

INTRODUCTION

Electric vehicles (EVs) can be powered using batteries that store energy to reduce greenhouse gas emissions. The batteries can include different components facilitating energy storage.

SUMMARY

This disclosure is generally directed to an interface for a current collector and a busbar in a battery module. For example, an electric vehicle (EV) can include a battery module in which one or more busbars of the battery module are electrically coupled with one or more current collectors using one or more interface components. An EV can include a battery pack that can include any number of battery modules, having any number of battery cells for storing energy. Battery modules can conduct electrical power towards and away from the battery cells in a battery module via one or more current collectors that are connected to busbars. However, electrically connecting current collectors with busbars can be challenging in the context of battery module manufacturing. The present technical solution provides an electrically conductive interface to electrically couple a current collector and a busbar in a more efficient manufacturing process that can improve the performance and the manufacturing efficiency of the battery module. The resulting design can include one or more electrically conductive interface components that can be electrically coupled with the current collector and welded to the busbar, thereby providing a strong electrical coupling between the busbar and the current collector. For example, an interface component can be an integral part of a layer of a current collector, protruding from the current collector to electrically couple with the busbar. The interface component can then be curved or bent about an edge of a busbar to be coupled with and attached using one or more welds at or near the edge of the busbar. The resulting coupling can establish both a physical and an electrical continuity between the busbar and the current collector.

At least one aspect is directed to a system. The system can include a current collector of a battery, a busbar of the battery and an interface. The interface can be electrically coupled with the current collector. The interface can be coupled with the busbar via a weld between the interface and the busbar.

At least one aspect is directed to a system. The system can include a current collector of a battery module, a busbar of the battery module and a component. The component can be disposed about an edge of the busbar. The component can be electrically coupled with the current collector. The component can be coupled with the busbar via a weld between the component and the busbar.

At least one aspect is directed to a method. The method can provide a current collector of a battery. The method can provide a busbar of the battery. The method can provide an interface electrically coupled with the current collector. The interface can be coupled with the busbar via a weld between the interface and the busbar.

At least one aspect is directed to a method. The method can provide a current collector on a top side of a battery module. The method can provide a busbar on a side of the battery module abutting the top side. The method can electrically couple a first part of a component with the current collector. The method can dispose the component about an edge of the busbar. The method can electrically couple a second part of the component via a first weld with a first region of the busbar.

At least one aspect is directed to an electric vehicle. The electric vehicle can include a current collector of a battery, a busbar of the battery and an interface. The interface can be electrically coupled with the current collector. The interface can be coupled with the busbar via a weld between the interface and the busbar.

At least one aspect is directed to an electric vehicle. The electric vehicle can include a battery module. The battery module can include a current collector of the battery module. The battery module can include a busbar of the battery module. The battery module can include a first component of the battery module curving about an edge of the busbar to electrically couple a layer of the current collector and with the busbar. The first component can be coupled with the busbar via a first weld at a first region of the busbar. The battery module can include a second component curving about the edge of the busbar to electrically couple the layer of the current collector with the busbar, the second component coupled with the busbar via a second weld at a second region of the busbar.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of electrically coupling current collectors with busbars of a battery module. The various concepts introduced above and discussed in greater detail below may be implemented in any of numerous ways.

This disclosure is generally directed to a solution for providing an electrically conductive interface between a busbar and a current collector of a battery module in an electric vehicle (EV). An EV can store energy in a battery pack which can include any number of interconnected battery modules that can have any number of battery cells. Each of the battery modules can transfer electricity to and from their battery cells using current collectors and busbars that are electrically connected to each other. However, electrically connecting current collectors with busbars in battery modules can be challenging in the context of battery module manufacturing. For example, when battery modules are assembled, cobbling processes for creating connections between current collectors and busbars can be time consuming and complex, which may result in inefficient manufacturing or reduced performance for the battery module.

An aspect this technical solution can provide an electrically conductive interface between the current collector and the busbar of a battery module in a more efficient manufacturing process that can improve the performance of the battery module. The resulting design can include one or more electrically conductive components, such as thin sheets of metal, electrically connecting a current collector and a busbar via one or more welds at or near the edge of at least one of the current collector or the busbar. For example, each electrically conductive component can include a first and a second part. A first part of the electrically conductive component can be electrically coupled with a current collector, such as via welding to layer of a current collector, or by the virtue of being an integral component of one of the layers of the current collector. The second part of the component that can be welded to a weld area near an edge of a busbar. The battery module can also include other components similarly welded along the same or different edges of the current collector and the busbar. Using this technique the present solution can provide a strong electrically conductive interface between the current collector and the busbar in a simple and efficient manufacturing process that uses fewer components.

Figure 1:
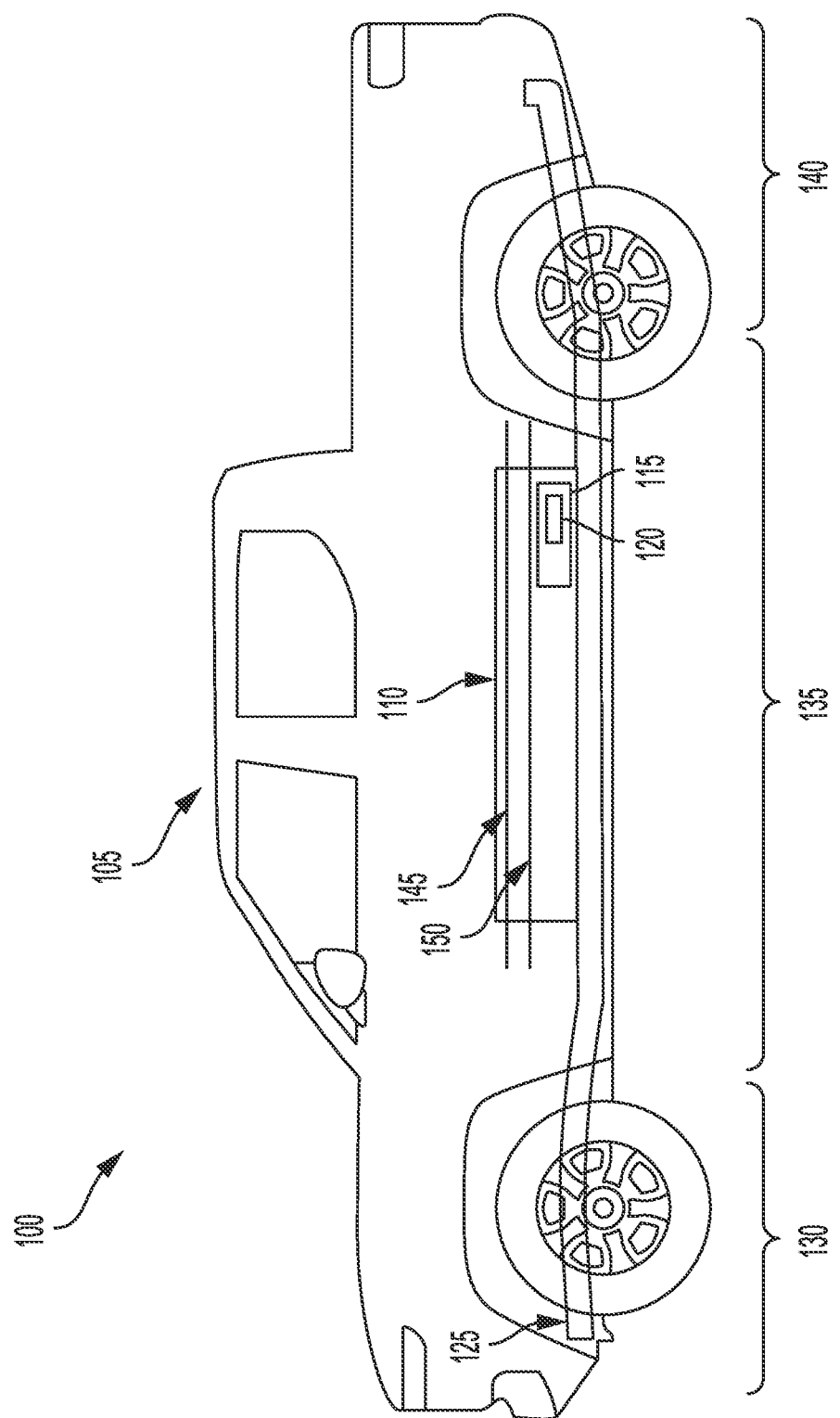
FIG. 1 depicts an example electric vehicle.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
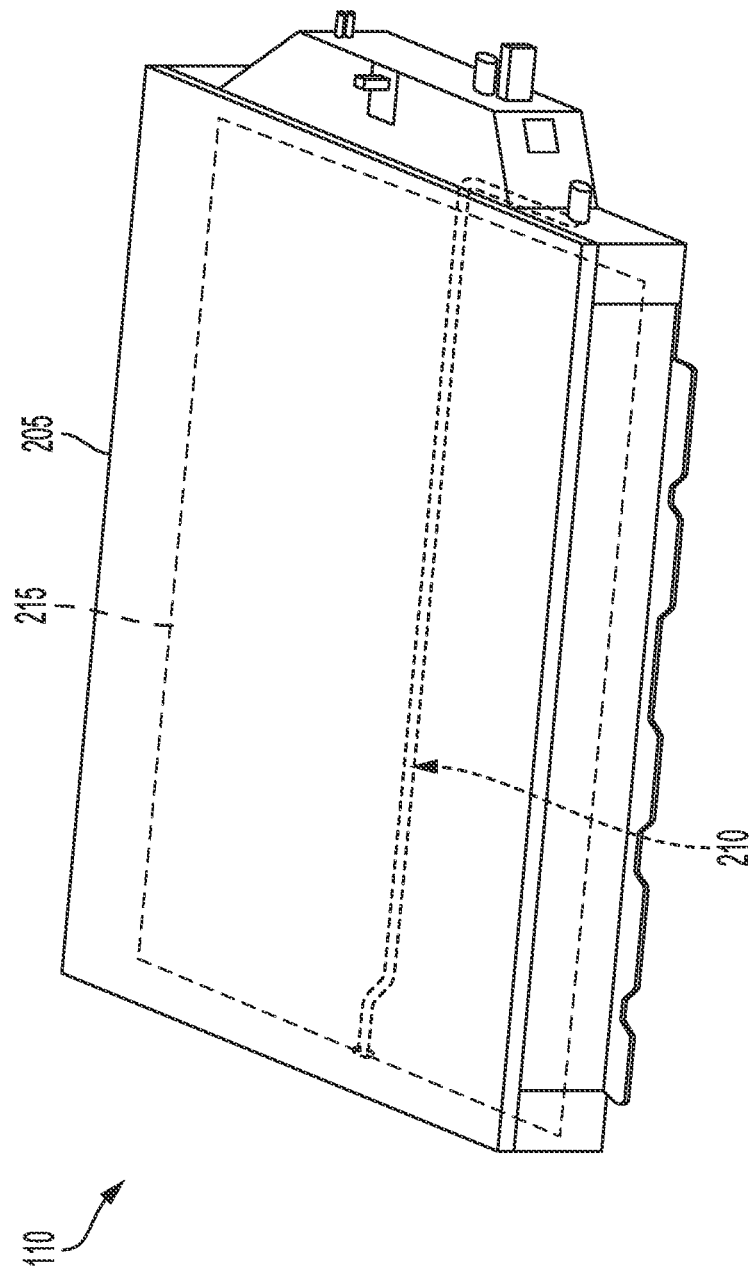
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
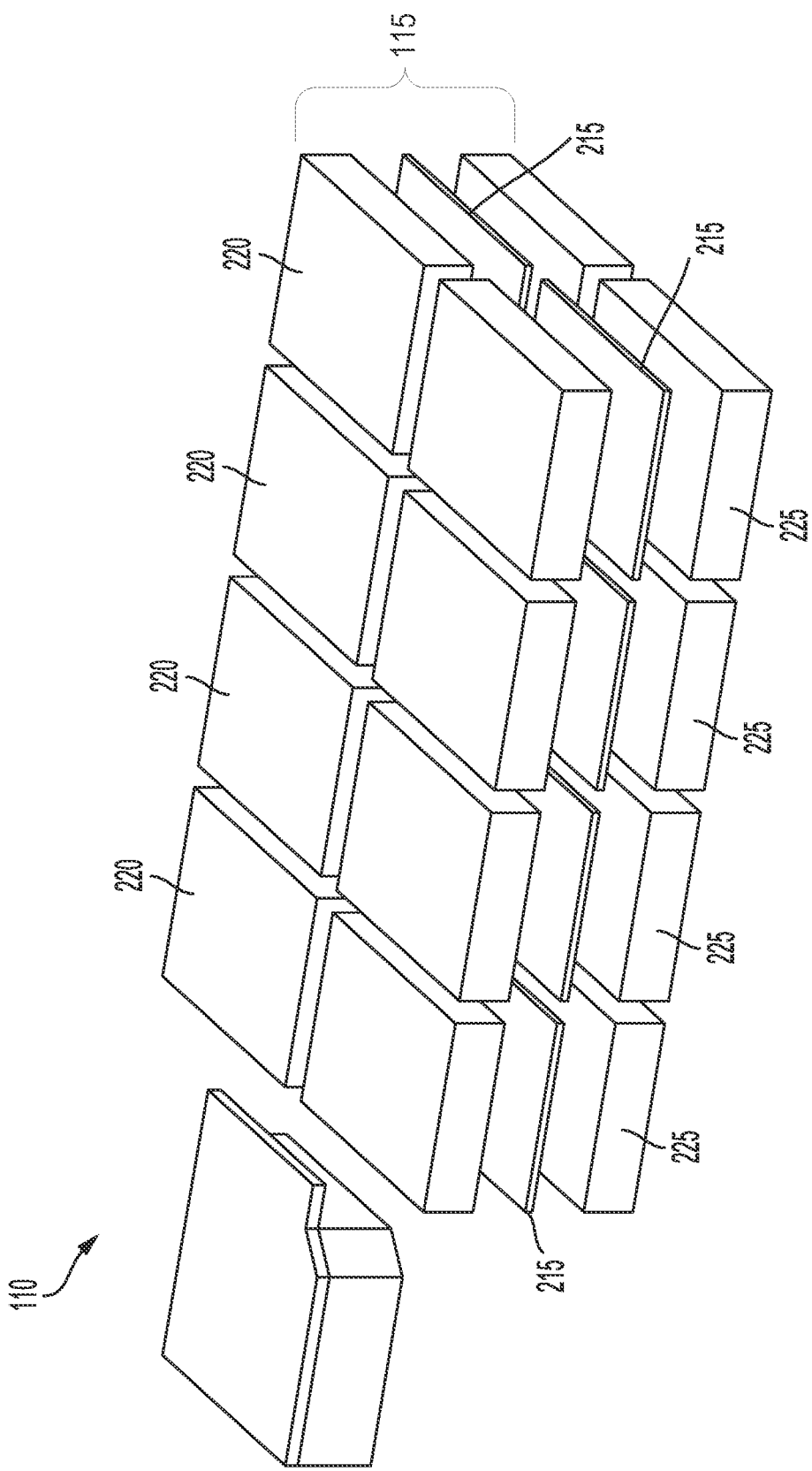
FIG. 2B depicts an example of one or more battery modules.
Figure 2C:
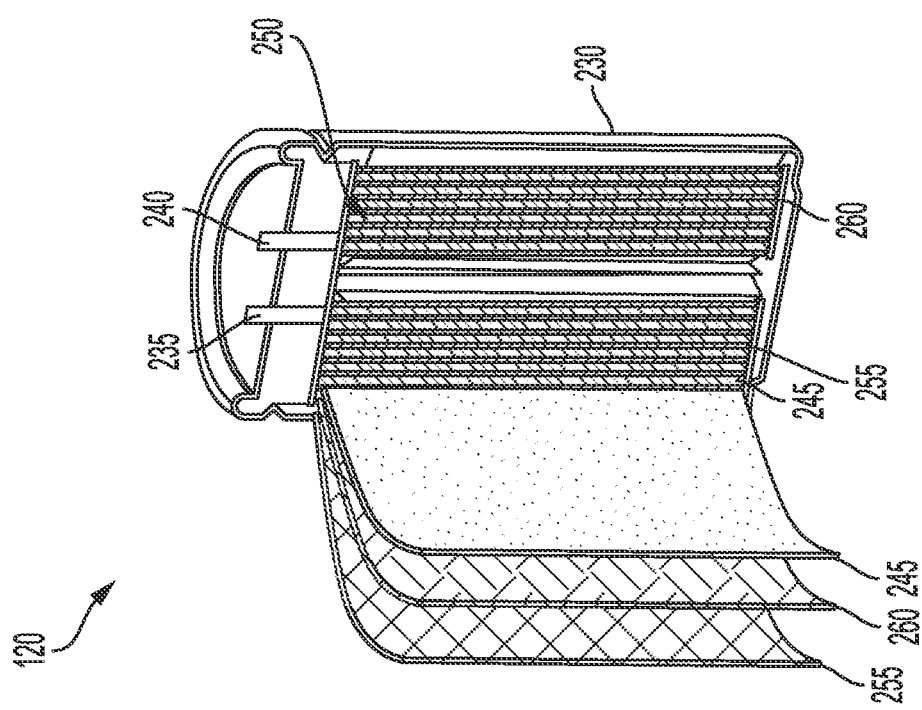
FIG. 2C depicts a cross sectional view of a battery cell.
Figure 2D:
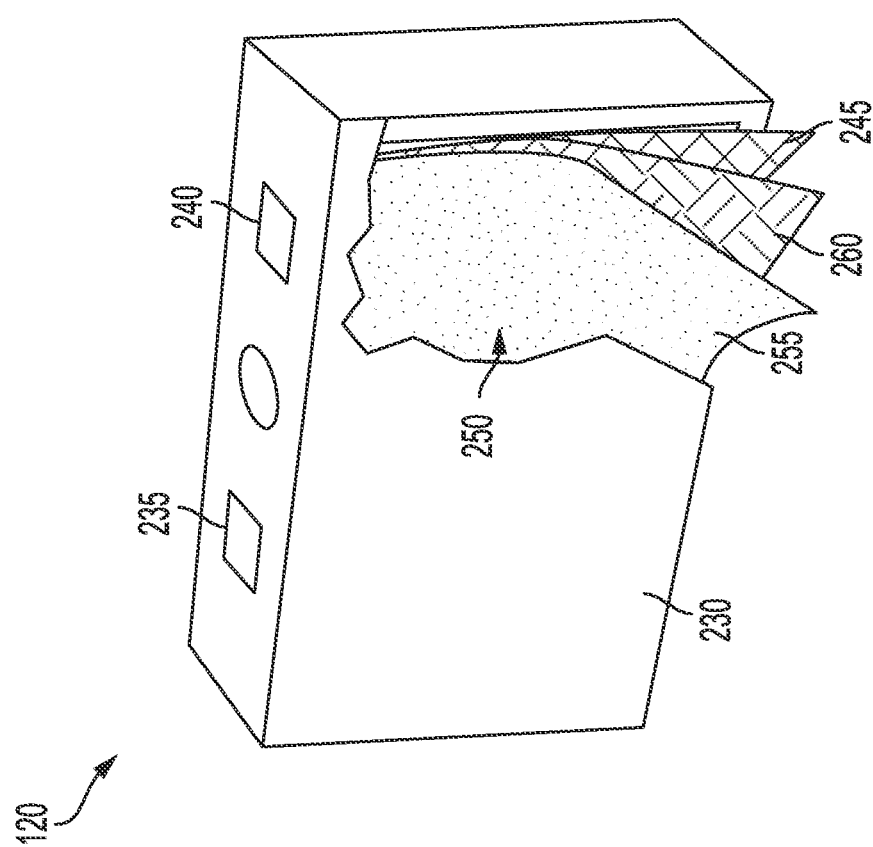
FIG. 2D depicts a cross sectional view of a battery cell.
Figure 2E:
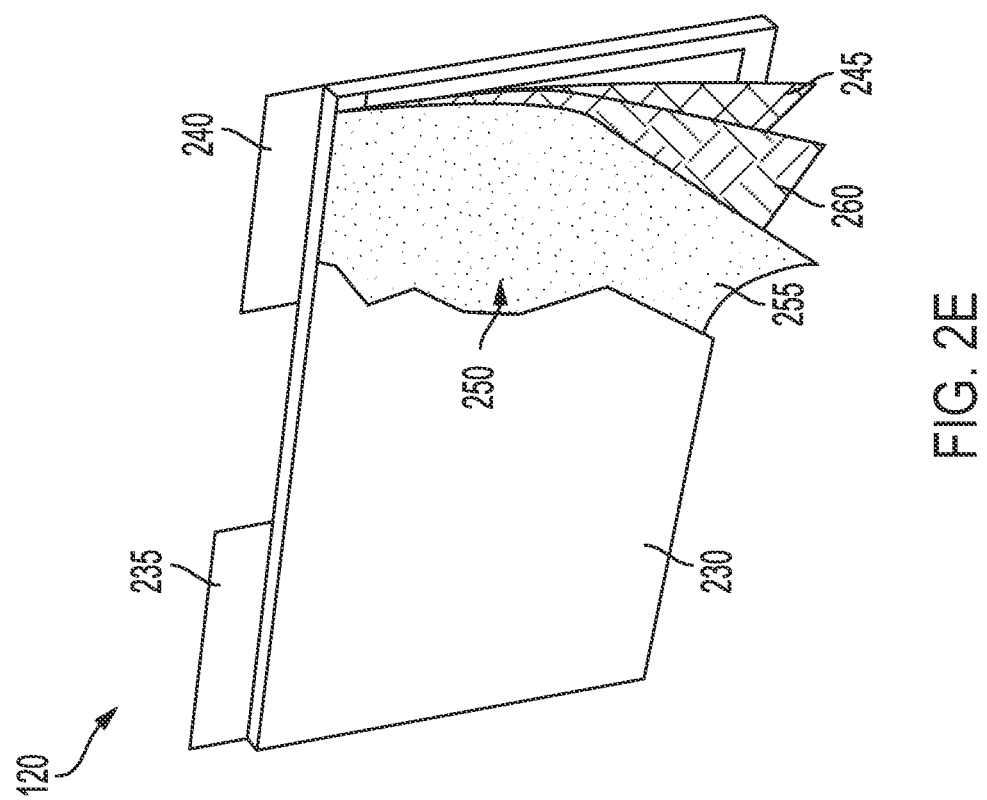
FIG. 2E depicts a cross sectional view of a battery cell.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, and ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., $Li_3PS_4$, $Li_7P_3S_{11}$, $Li_2S$—$P_2S_5$, $Li_2S$—$B_2S_3$, $SnS$—$P_2S_5$, $Li_2S$-$SiS_2$, $Li_2S$—$P_2S_5$, $Li_2S$—$GeS_2$, Li10GeP2S12) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some embodiments, the battery pack may not include modules. For example, the battery pack can have a cell-to-pack configuration wherein battery cells are arranged directly into a battery pack without assembly into a module.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_2$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with sp2 hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 120 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can help transfer ions between the anode layer 245 and the cathode layer 255. The electrolyte layer 260 can transfer $Li^+$ cations from the anode layer 245 to the cathode layer 255 during the discharge operation of the battery cell 120. The electrolyte layer 260 can transfer lithium ions from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an NMC (Nickel Manganese Cobalt) chemistry, an NCA (Nickel Cobalt Aluminum) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, lithium-ion batteries can include an olivine phosphate (Li M PO4, M=Fe and/or Co and/or Mn and/or Ni)) chemistry, LISICON or NASICON Phosphates (Li3M2 (PO4)3 and LiMPO4Ox, M=Ti, V, Mn, Cr, and Zr), for example Lithium iron phosphate (LFP), Lithium iron manganese phosphate (LMFP), a layered oxides (LiMO2, M=Ni and/or Co and/or Mn and/or Fe and/or Al and/or Mg) examples NMC (Nickel Manganese Cobalt) chemistry, an NCA (Nickel Cobalt Aluminum) chemistry, or an LCO (lithium cobalt oxide) chemistry for a cathode layer, Lithium rich layer oxides (Li1+xM1−xO2) (Ni, and/or Mn, and/or Co), (OLO or LMR), spinel (LiMn2O4) and high voltage spinels (LiMn1.5Ni0.5O4), disordered rock salt, Fluorophosphates Li2FePO4F (M=Fe, Co, Ni) and Fluorosulfates LiMSO4F (M=Co, Ni, Mn) (e.g., the cathode layer 255). Lithium-ion batteries can include a graphite chemistry, a silicon-graphite chemistry, or a lithium metal chemistry for the anode layer (e.g., the anode layer 245). For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and Lithium iron manganese phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or combination thereof. The current collector material can be a metal foil coated with a carbon material, such as carbon-coated aluminum foil, carbon-coated copper foil, or other carbon-coated foil material.

The electrolyte layer 260 can include or be made of a liquid electrolyte material. For example, the electrolyte layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the electrolyte layer 260 can include, for example, lithium tetrafluoroborate (LiBF$_4$), lithium hexafluorophosphate (LiPF$_6$), and lithium perchlorate (LiClO$_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof.

In some embodiments, the solid electrolyte film can include at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or combinations thereof. In some embodiments, the solid electrolyte layer can include polyanionic or oxide-based electrolyte material (e.g., Lithium Superionic Conductors (LISICONs), Sodium Superionic Conductors (NASICONs), perovskites with formula ABO3 (A=Li, Ca, Sr, La, and B=Al, Ti), garnet-type with formula A3B2(XO4)3 (A=Ca, Sr, Ba and X=Nb, Ta), lithium phosphorous oxy-nitride (LixPOyNz). In some embodiments, the solid electrolyte layer can include a glassy, ceramic and/or crystalline sulfide-based electrolyte (e.g., Li3PS4, Li7P3S11, Li2S-P2S5, Li2S-B2S3, SnS—P2S5, Li2S-SiS2, Li2S-P2S5, Li2S-GeS2, Li10GeP2S12) and/or sulfide-based lithium argyrodites with formula Li6PS5X (X=Cl, Br) like Li6PS5Cl). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

In examples where the electrolyte layer 260 includes a liquid electrolyte material, the electrolyte layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The electrolyte layer 260 can include at least one additive. The additives can be or include vinylidene carbonate, fluoroethylene carbonate, ethyl propionate, methyl propionate, methyl acetate, ethyl acetate, or a mixture of any two or more thereof. The electrolyte layer 260 can include a lithium salt material. For example, the lithium salt can be lithium perchlorate, lithium hexafluorophosphate, lithium bis(fluorosulfonyl)imide, lithium bis(trifluorosulfonyl) imide, or a mixture of any two or more thereof. The lithium salt may be present in the electrolyte layer 260 from greater than 0 M to about 1.5 M.

Figure 3:
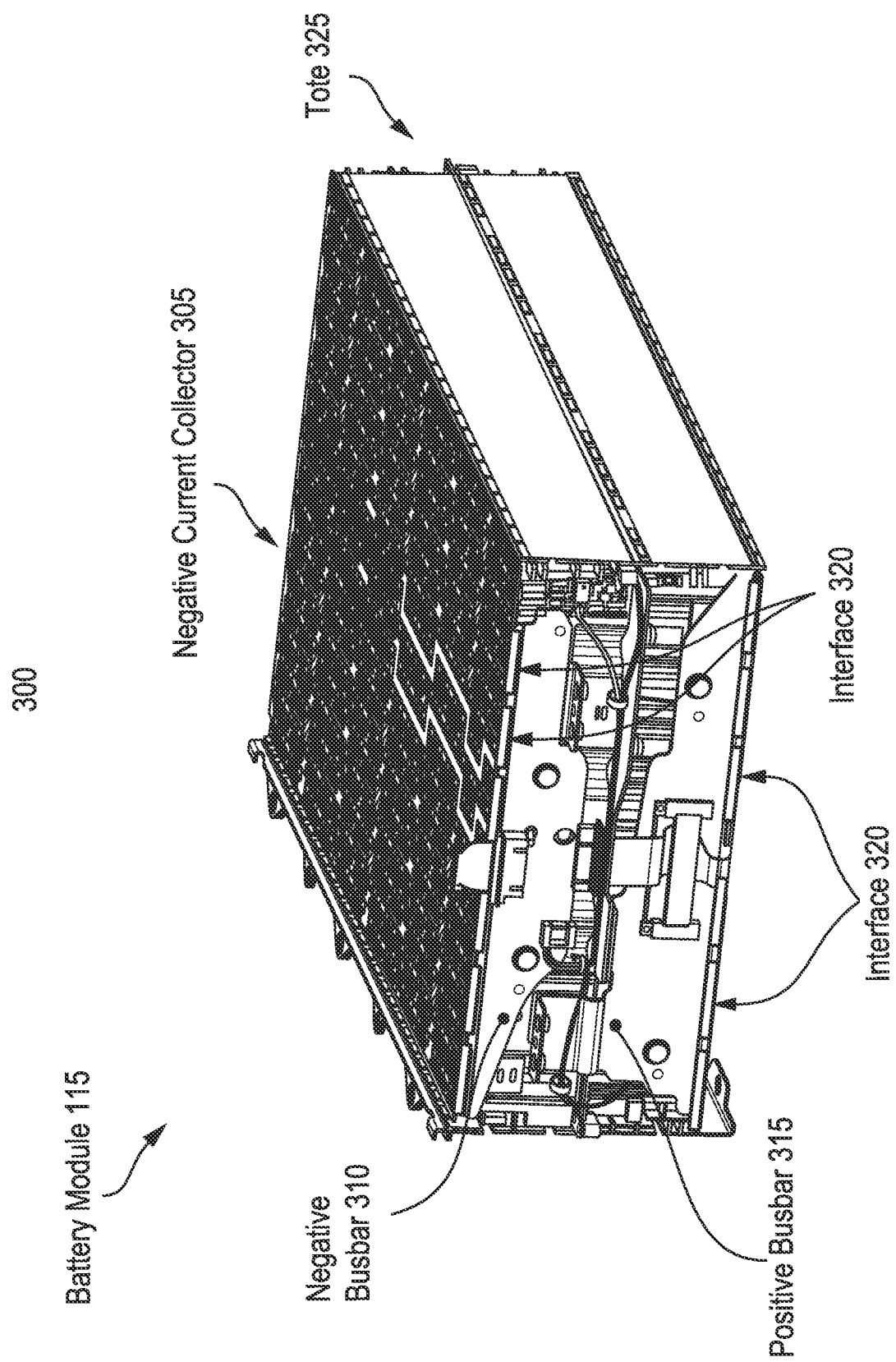
FIG. 3 depicts a front-side view of an embodiment of a battery module.
Figure 4:
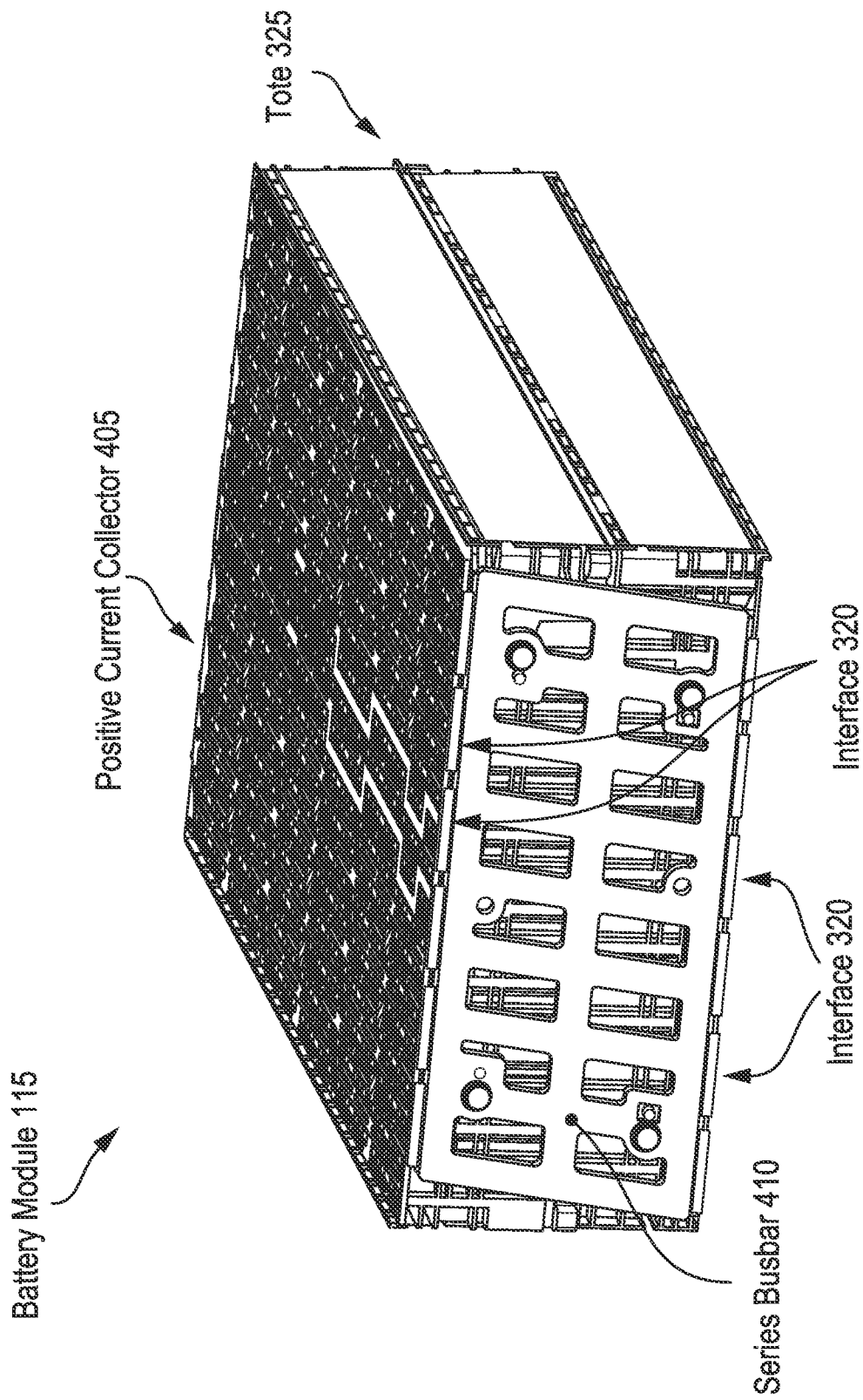
FIG. 4 depicts a rear-side view of an embodiment of a battery module.

FIG. 3 depicts a front perspective view of an example battery module 115 of a system 300. FIG. 4 depicts a rear perspective view of the example battery module 115. The battery module 115 illustrated in FIGS. 3 and 4 can be included in a battery pack 110 of an EV 105, along with any number of battery modules 115. The battery module 115 can include one or more totes 325 that can include or provide structure to support, hold or carry thereon one or more current collectors, such as a negative current collector 305 or a positive current collector 405. The tote 325 can also include or provide support structure to support, hold or carry thereon one or more busbars, such as a negative busbar 310, a positive busbar 315 or a series busbar 410. For example, the current collectors 305 or 405 and the busbars 310, 315 or 410 can each be supported on the outer surface of a cuboid shaped tote 325. Providing electrical coupling between any of the current collectors 305 or 405 and the busbars 310, 315 or 410 are one or more interface components 320, which can also be referred to as the interfaces 320. Interface components 320 can be electrically coupled to the current collectors 305 or 405 and to the busbars 310, 315 or 410 in a variety of ways, such as via weld or soldering contacts, connectors, clips, or other forms of electrical coupling or attachment, or by being an integral component of a current collector 305 or 405, or a busbar 310, 315 or a 410. In an example, the illustrated example of a battery module 115 can form a battery pack 110 and the battery pack 110 can include all the features of the illustrated battery module 115, including for example current collectors 305 or 405, busbars 310, 315 or 410 and tote 325. The battery pack 110 can include battery cells 120 housed within the tote 325.

FIG. 3 depicts a front-side perspective of an example system 300 in which a tote 325 of a battery module 115 supports a negative current collector 305 on one of its outer surfaces, or on one of its outer perimeters that can be offset with respect to the outer surfaces of the tote 325 by set offset or distance apart. For example, a tote 325 can include a top outer surface or a top outer perimeter at which the negative current collector 305 can sit, be disposed on, be affixed to, or otherwise provided on a structure that provides an offset between the negative current collector 305 and the tote 325. For example, an outer surface of the tote 325 can include a surface on which a current collector 305 or 405 can be affixed or attached directly on the surface. Current collectors 305 or 405 can be affixed or disposed at an outer perimeter that can be defined or offset with respect to an outer surface of the tote 325, such as for example via pins that a set distance apart from the outer surface of the tote 325 on which, or over which, the current collector 305 or 405 is disposed.

The tote 325 can further support on its side outer surface, or its side outer perimeter, one or more busbars, such as the negative busbar 310 and the positive busbar 315. The top outer surface or a perimeter can share an edge with a side outer surface or a perimeter, at which, or about which, one or more interface components 320 can curve or bend in order to provide electrical coupling between the negative current collector 305 and the negative busbar 310. The interface components 320 can be integral parts of the negative current collector 305. For example, interface components 320 can be tabs or portions of a metal sheet layer of the current collector 305 that protrudes from the remained of the metal sheet within the current collector. The interface components 320 can protrude or extend from a portion of the negative current collector 305. The interface components 320 can be curved or bent about an edge of a busbar, such as a negative busbar 310, positive busbar 315 or series busbar 410. The interface components 320 can be curved about or above the corner edge of the tote 325 or the battery module 115. The interface components 320 can be attached to the negative busbar 310, or the positive busbar 315 or the series busbar 410. The interface components 320 can be attached to the busbars 310, 315 or 410, for example, via any one or more of welding, soldering, physical attachment, clips, connectors, locking mechanism or otherwise creating a physical coupling or a contact between the interface component 320 and the busbar 310, 315 or 320.

FIG. 4 depicts a rear-side perspective view of an example battery module 115 in which the tote 325 provides a structure for supporting on its bottom outer surface or a bottom outer perimeter, a positive current collector 405. The positive current collector 405 can be disposed, affixed or supported on the outer bottom surface of the tote 325 or its outer perimeter. The side, or the outer surface or perimeter on which the positive current collector 405 is disposed, affixed or supported can be opposite to the outer top surface or its perimeter on which the negative current collector 305 is disposed, affixed or supported. For example, the negative current collector 305 and the positive current collector 405 can be supported on opposite sides, planes or faces of the battery module 115. Similarly, the series busbar 410 can be disposed, affixed or supported on a side surface of the tote 325 or its perimeter that is opposite to the side surface of the tote 325 or its perimeter on which the negative busbar 310 and the positive busbar 315 are disposed, affixed or supported. For example, the series busbar 410 can be supported on opposite sides, planes or faces of the battery module 115 from the positive and negative busbars 315 and 310.

Series busbar 410 can be electrically coupled with both the positive current collector 405 and the negative current collector 305, via one or more interfaces 320. For example, one or more interface components 320 can be curved about or bent over an edge of the busbar 410 or the corner of the tote 325 or the battery module 115. Series busbar 410 can be electrically coupled with the negative current collector 305, via one or more interfaces 320 along another edge of the series busbar 410. For example, the series busbar 410 can have one or more interfaces 320 from a positive current collector 405, or coupled to the positive current collector 405, that are also electrically coupled with the series busbar 410 along one edge of the series busbar 410. The series busbar 410 can include another one or more interfaces 320 from a negative current collector 305, or coupled with the negative current collector 305, that are coupled with the series busbar 410 along another edge of the series busbar 410. The series busbar 410 can provide electrical continuity between the negative current collector 305 and the positive current collector 405. The series busbar 410 can provide electrical insulation between the negative current collector 305 and the positive current collector 405. The two edges of the series busbar 410 along which, or via which, the series busbar 410 can be electrically coupled with both the current collectors 305 and 405 can be edges that are opposite to each other, such as for example two opposite edges of a rectangular metal plate that can form the busbar 410. The series busbar 410 can include any other shaped metal plate, including square, rectangular, elliptical, triangular, pentagonal or any the shape of any other polygon.

Battery module 115 and its components can be shaped in a variety of ways. Illustrated in FIGS. 3 and 4 is an example battery module 115 shaped as a cuboid or a rectangular prism. The battery module 115 can be any shape, such as a cube, a pyramid, a trigonal prism, a tetragonal prism, tetrahedron, decahedron, dodecahedron, or any other polyhedron, a sphere, a semi-sphere, a cylinder or other geometric shape, for example. The shape can be defined by any number of battery module 115 components, such as tote 325, current collectors 305, 405 and busbars 310, 315 or 410. For example, the tote 325 can be shaped as a rectangular prism and can support on its outer surfaces or perimeters any number of more current collectors 305 or 405, busbars 310, 315 or 410 and interfaces 320. For example, tote 325 can support, or carry thereon, a negative current collector 305, which can be affixed to or disposed on a surface or a perimeter from the surface of the tote 325 as well as a negative busbar 310 on a side surface or a perimeter from the side surface of the tote 325. The interface components 320 can be curved or bent over the edge of the tote 325 or the edge of the negative busbar 310, thereby electrically coupling the negative current collector 305 to the negative busbar 310 over the edge of the tote 325 or the edge of the busbar, such as 310, 315 or 410. For example, tote 325 can support or carry thereon a positive current collector 405, which can be affixed to or disposed on a surface or a perimeter from the surface of the tote 325. Tote 325 can support thereon a positive busbar 315 on a side surface, or a perimeter from the side surface, of the tote 325. The interface components 320 can be curved, hooked or bent over the edge of the tote 325, or over the edge of the positive busbar 315, thereby electrically coupling the positive current collector 405 to the positive busbar 315 over the edge of the tote 325. For example, tote 325 can support or carry thereon a series busbar 410, which can be affixed to or disposed on a surface or a perimeter that is opposite to the one on which the negative and positive busbars 310 and 315 are affixed or disposed. One set of one or more interface components 320 can be curved or bent over a first edge of the tote 325 or the series busbar 410. The hooked, curved or bent interfaces 320 can electrically couple the positive current collector 405 and the series busbar 410 to each other over a first edge of the series busbar 410 or the tote 325. Another set of one or more interface components 320 can be curved or bent over a second edge of the tote 325 or the series busbar 410, thereby electrically coupling the negative current collector 305 to the series busbar 410 over a second edge of the series busbar 410 or the tote 325.

The tote 325 can include, house, enclose or comprise battery cells 120, which can be electrically coupled with the current collectors 305 and 405. Battery cells 120 can be organized within the tote 325 so that they are supported and held in place by the tote 325. Battery cells 120 in the tote 325 can be electrically coupled or connected to by components of the current collector 305 and 405. Battery cells 120 can be in electrical contacts with the busbars 310, 315 and 410 via current collectors 305 or 405.

Tote 325 can include variety of materials for providing structural support, such as any one or more metals and metal alloys, ceramics, plastics and more. Tote 325 can comprise a hollow structure and allow for one or more air flow paths for thermal management and natural convection cooling. Tote 325 can include multiple vertical and horizontal sections separate by air gaps. Tote 325 can include structures and components to provide mechanical and structural support for the battery module 115, separated by air gaps. Tote 325 can include one or more interfaces for supporting, connecting with, or coupling with any one or more of busbars 310, 315 or 405 or current collectors 305 or 405.

Figure 5:
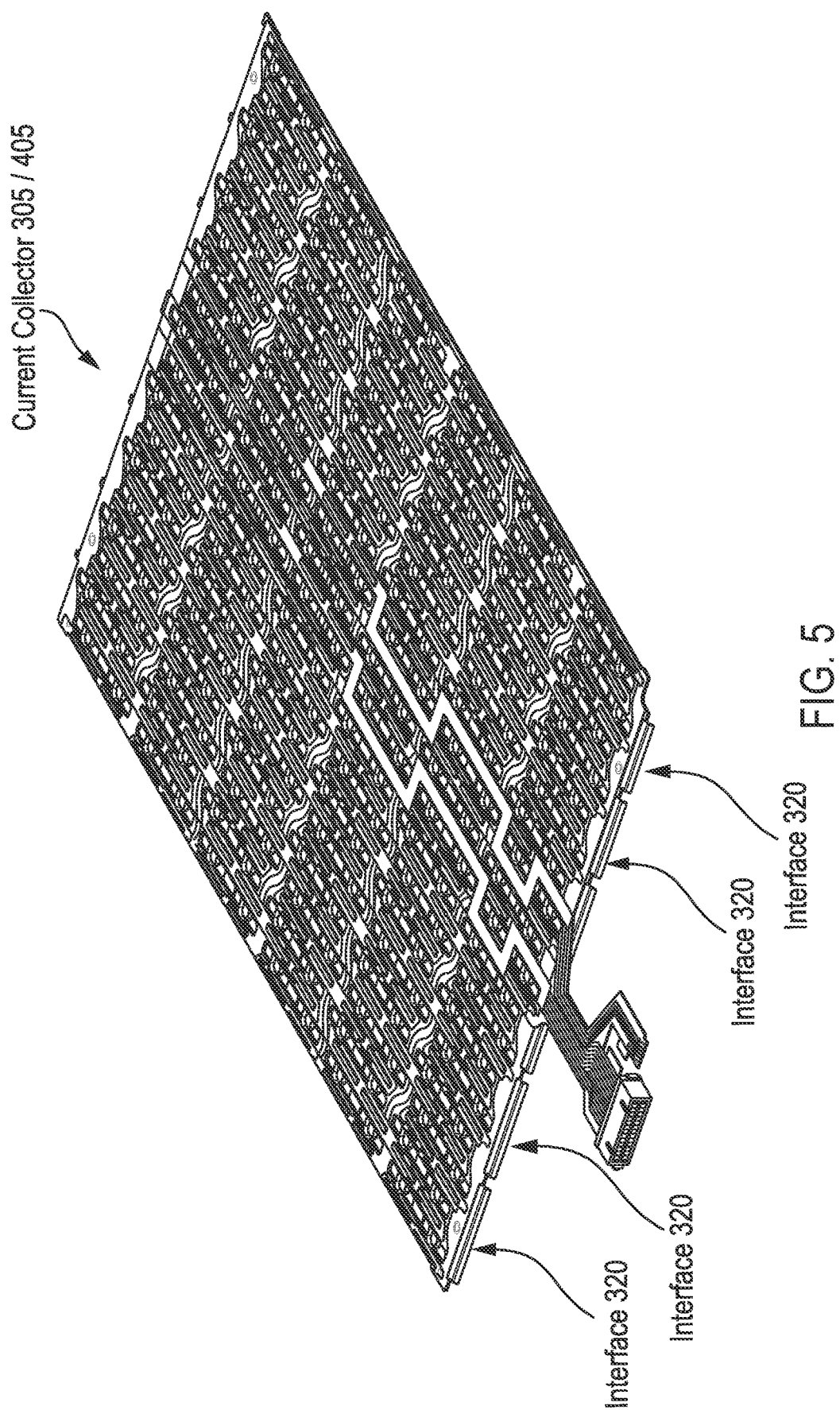
FIG. 5 depicts an example of a current collector.
Figure 6:
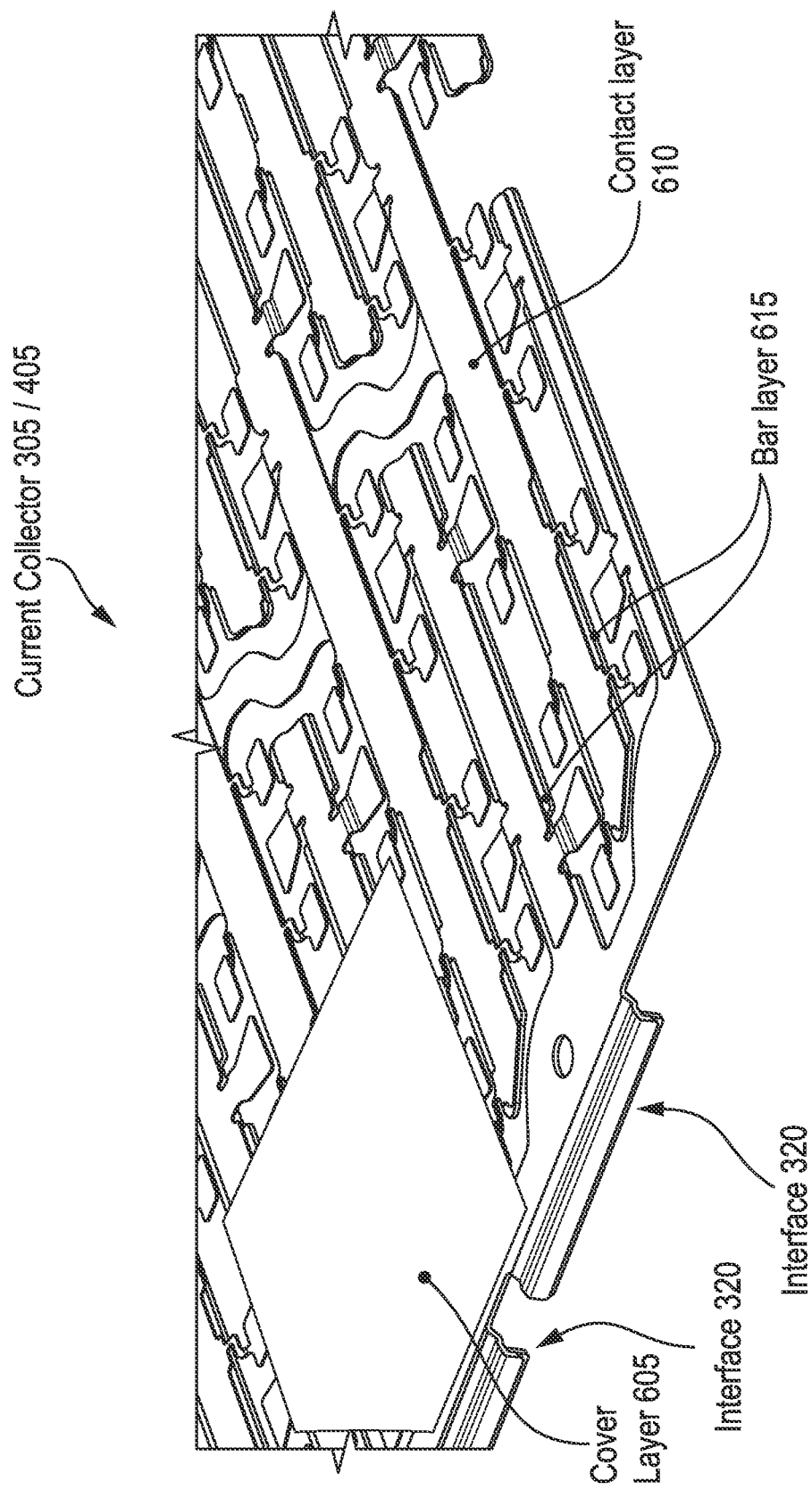
FIG. 6 depicts a close-up view of an example of a current collector.

FIG. 5 depicts an example current collector, such as a negative current collector 305 or a positive current collector 405. FIG. 6 depicts an example negative current collector 305 or positive current collector 405. Current collector 305 or 405 can include multiple features, including, for example, ribs, structures, channels, openings, or through holes. Current collectors 305 or 405 can include multiple layers, such as a cover layer 605, contact layer 610 or a bar layer 615. A cover layer 605 can include an electrically insulative layer, such as a plastic layer, rubber layer or any layer of electrical insulator material. Bar layer 615 can include a layer of electrical conductor sheet for efficiently conducting electricity to and from battery cells 120 of the battery module 115. The contact layer 610 can include a sheet of metal including tabs shaped to electrically couple with individual battery cells 120 of the battery module 120.

Interface components 320 can be electrically coupled to one or more of the layers of the current collector 305 or 405, such as the bar layer 615 or the contact layer 610. Current collector 305 or 405 can include electrically conductive materials allowing for a sufficient current density through the current collector 305 or 405 to provide the energy for the EV 105. For example, a bar layer 615 or the contact layer 610 that include one or more interfaces 320 as integral parts or integral components of the bar layer 615 or the contact layer 610, where the one or more interfaces 320 include tabs that protrude from the bar layers 615 or the contact layer 610 of the current collector 305 or 405. For example, an interface 320 can include a tab formed from the same sheet of material that comprises or forms bar layer 615. The interface 320 can include a tab that protrudes from the bar layer 615 outward to couple with the busbar 310, 315 or 410. The interface 320 and the bar layer 615 can comprise the same sheet of metal.

FIG. 5 depicts a current collector 305 or 405 that can include a plurality of interfaces components 320. Interfaces 320 can be attached to, electrically coupled with, or be integral components of the one or more of the layers of the current collector 305 or 405, such as, for example, the bar layer 615. Interfaces 320 can extend from an outer edge of the current collector 305 or 405 to overlay or overlap at least a portion of the busbar 310, 315 or 410 to which it can be welded. For example, one or more interfaces 320 can protrude from or extend from the bar layer 615 and can include the same material as the bar layer 615. For example, interfaces 320 can include the same thickness as the bar layer 615.

FIG. 6 depicts a close-up view of the current collector 305 or 405. FIG. 6 depicts current collector 305 or 405 comprising a bar layer 615, a contact layer 610 and a cover layer 605 which can be ordered in any arrangement. For example, the current collector 305 or 405 can include a bar layer 615, on top of which a contact layer 610 is disposed, welded or affixed, while on top of the contact layer 610 can be an electrically insulating cover layer 605. For example, the current collector 305 or 405 can include a bar layer 615 that is on top of a contact layer 610, with a cover layer 605 on top of the bar layer 615. Current collector 305 or 405 can include additional layers, such as intervening layers between any one or more of layers 605, 610 or 615.

Bar layer 615 can include a sheet or a slab of electrically conductive material extending across the length and width of the current collector 305 or 405. Bar layer 615 can include a plate or a sheet of electrically conductive material, such as copper, silver, gold, aluminum, beryllium, magnesium, indium or any other electrical conductor. Bar layer 615 can include a sheet having a thickness of between 100 micrometers and 5 millimeters. The thickness can be commensurate with the width and the length of the current collector 305 or 405 to allow for an efficient current density to be conducted across the current collector 305 or 405. For example, the thickness of the bar layer 615 can be up to about 100 um, 200 um, 300 um, 400 um, 500 um, 600 um, 700 um, 800 um, 900 um, 1 mm, 1.5 mm, 2 mm, 2.5 mm, 3 mm, 4 mm, 5 mm. For example, bar layer 615 can include a thickness of between 300 to 600 um, inclusively, such as for example 400 um. Bar layer 615 can include a thickness that is greater than the thickness of the contact layer 610. Bar layer 615 can be electrically coupled with the contact layer 610 that is thinner than 400 micrometers, such as 200 micrometers, 100 micrometers or less than 100 micrometers.

Contact layer 610 can include a sheet or a slab of electrically conductive material extending across the length and width of the current collector 305 or 405. Contact layer 610 can include a plate or a sheet of electrically conductive material, such as copper, silver, gold, aluminum, beryllium, magnesium, indium or any other electrical conductor. Contact layer 610 can include a sheet having a thickness of between 10 micrometers and 500 micrometers, such as, for example, up to about 10 um, 20 um, 30 um, 40 um, 50 um, 60 um, 70 um, 80 um, 90 um, 100 um, 150 um, 200 um, 300 um, 400 um or 500 um. Contact layer 610 can include a thickness that is less than the thickness of the bar layer 615. For example, the thickness of a contact layer 610 can be a fraction of the thickness of the bar layer 615, such as about up to about ¾, ⅔, ½, ⅓, ¼, ⅕, ⅙ or ⅛ of the thickness of the bar layer 615. Contact layer 610 can include tabs formed from the contact layer 610 sheet of material that is shaped, curved or bent to electrically couple with battery cells 120.

Interface 320, also referred to as the interface component 320, can include any piece of electrically conductive material that electrically couples current collector 305 or 405 with a busbar, such as the busbars 310, 315 or 410. Interface 320 can include a plate or a sheet of electrically conductive material, such as copper, silver, gold, aluminum, beryllium, magnesium, indium or any other electrical conductor. Interface 320 can be an integral part of a layer of a current collector 305 or 405, such as a protruding portion or a tab of a bar layer 615 or a contact layer 610 which can be electrically coupled with a busbar, such as busbar 310, 315 or 410.

Interface 320 can include a sheet of an electrical conductor material that can be electrically coupled with the current collector 305 or 405. For example, interface 320 can include a sheet of metal that is welded to, soldered to, or otherwise coupled with a bar layer 615 of the current collector 305 or 405. For example, interface 320 can include a sheet of metal that is welded to, soldered to, or otherwise coupled with a contact layer 610 of the current collector 305 or 405. Interface 320 can be welded to a bar layer 615 or contact layer 610 at one or more weld regions 705 that can be added to the bar layer 615 or contact layer 610.

Figure 7:
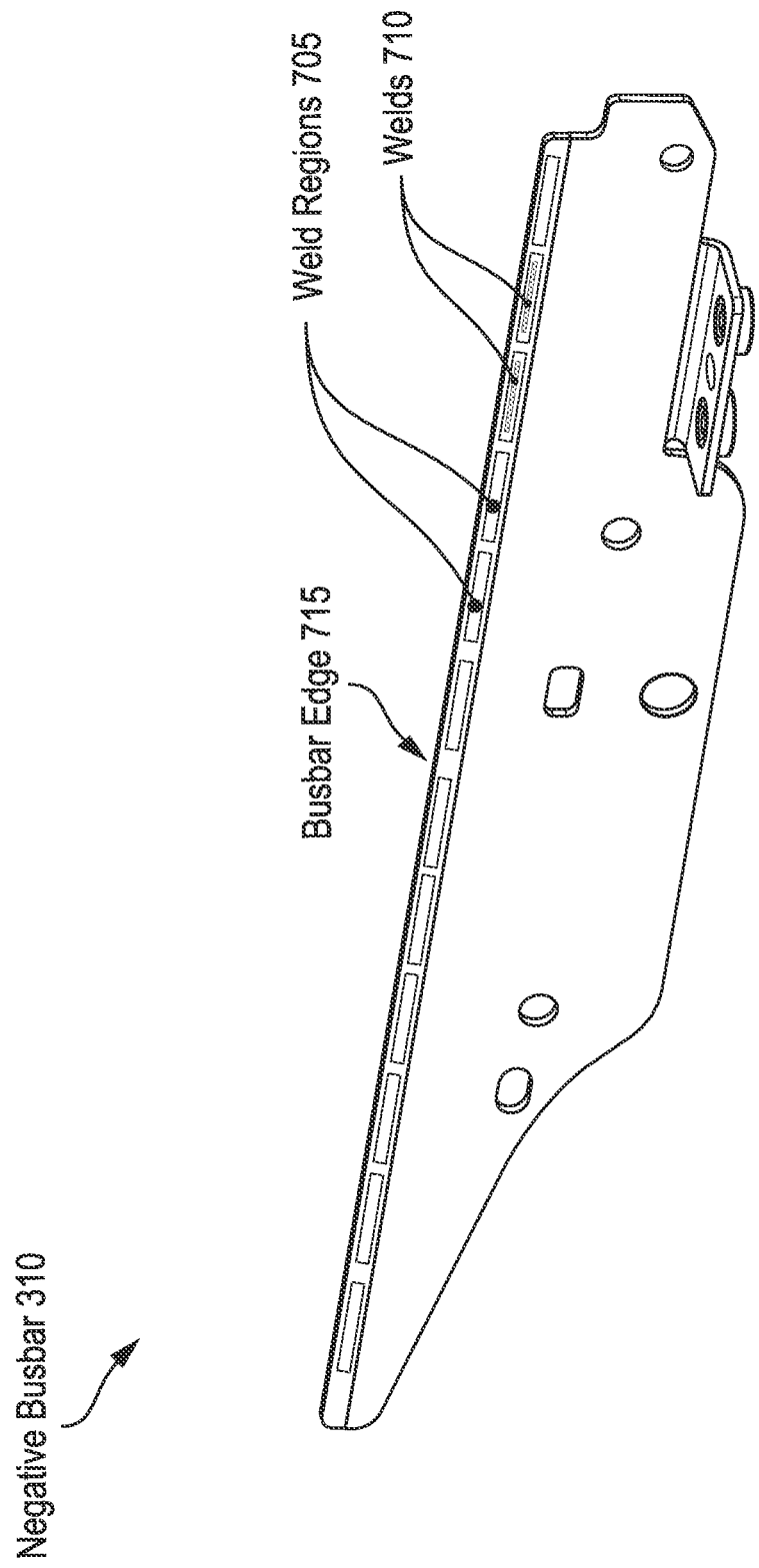
FIG. 7 depicts an example of a negative busbar.

FIG. 7 depicts a negative busbar 310 that can include a metal plate comprising an edge 715 about which interfaces 320 can be curved or bent to be attached, such as via welding, to the negative busbar 310. For example, interfaces 320 can be bent or curved about or around one or more edges 715 of a negative busbar 310. Negative busbar 310 can include a front surface that can be faced away from the tote 325 when integrated into a battery module 115. Negative busbar 310 can include a back surface that is opposite to the front surface and that is turned towards the tote 325 (e.g., battery cells 120 within the battery module 115) when the negative busbar 310 is integrated into the battery module 115.

On a surface of the negative busbar 310, one or more weld regions 705 can be disposed along and proximate to the busbar edge 715. Any surface of the negative busbar 310 can include weld regions 705. Weld regions 705 for forming welds 710 can be disposed or located on any surface of a negative busbar 310. For example, weld regions 705 can be formed on the front surface of the negative busbar 310, such as for example the surface facing away from the tote 325. Weld regions 705 can be formed on the top surface of the negative busbar 310, such as example the surface defining the thickness of the busbar 310. Weld regions 705 can be formed on the bottom surface of the negative busbar 310, such as for example the surface defining the thickness of the busbar 310 on the opposite side of the top surface. Weld regions 705 can be lined up along the top surface, the bottom surface, a top portion of the front surface (e.g., near the top surface edge) or a bottom portion of the front surface (e.g., near a bottom surface edge) of the negative busbar 310. For example, negative busbar 310 can include one or more the weld regions 705 on a side surface (e.g., top surface or a bottom surface) of the negative busbar 310. The side surface can be defined by the thickness of the negative busbar 310, such as along with and in proximity to the busbar edge 715 extending along the side surface of the negative busbar 310. Weld regions 705 and welds 710 can be made on a surface of the busbar 310, 315 or 410 that abuts the edge 715 over which the interface 320 is bent, curved or disposed, such as the front surface or the top surface of the busbar. Weld regions 705 and welds 710 can be set a distance apart from the busbar edge 715. Each of the weld regions 705 can include one or more welds 710 for welding interfaces 320 with the negative the negative busbar 310. Weld regions 705 can comprise any shape, such as a line, elongate rectangular, square, circular, elliptical or polygonal. Weld regions 705 can line up the front surface of the negative busbar 310 along with and proximate to the busbar edge 715. Welds 710 in the weld regions 705 can include any type and form of a weld, solder or similar coupling for connecting electrically conductive materials, such as metals. Welds 710 can comprise any shape, such as a line, elongate rectangular, square, circular, elliptical or polygonal. Welds 710 can line up the front surface of the negative busbar 310 and along with and proximate to the busbar edge 715, such as inside of the weld regions 705. Welds 710 can line up the side surface of the negative busbar 310 and along with and proximate to the busbar edge 715, such as inside of the weld regions 705 on the side surface of the negative busbar 310.

Figure 8:
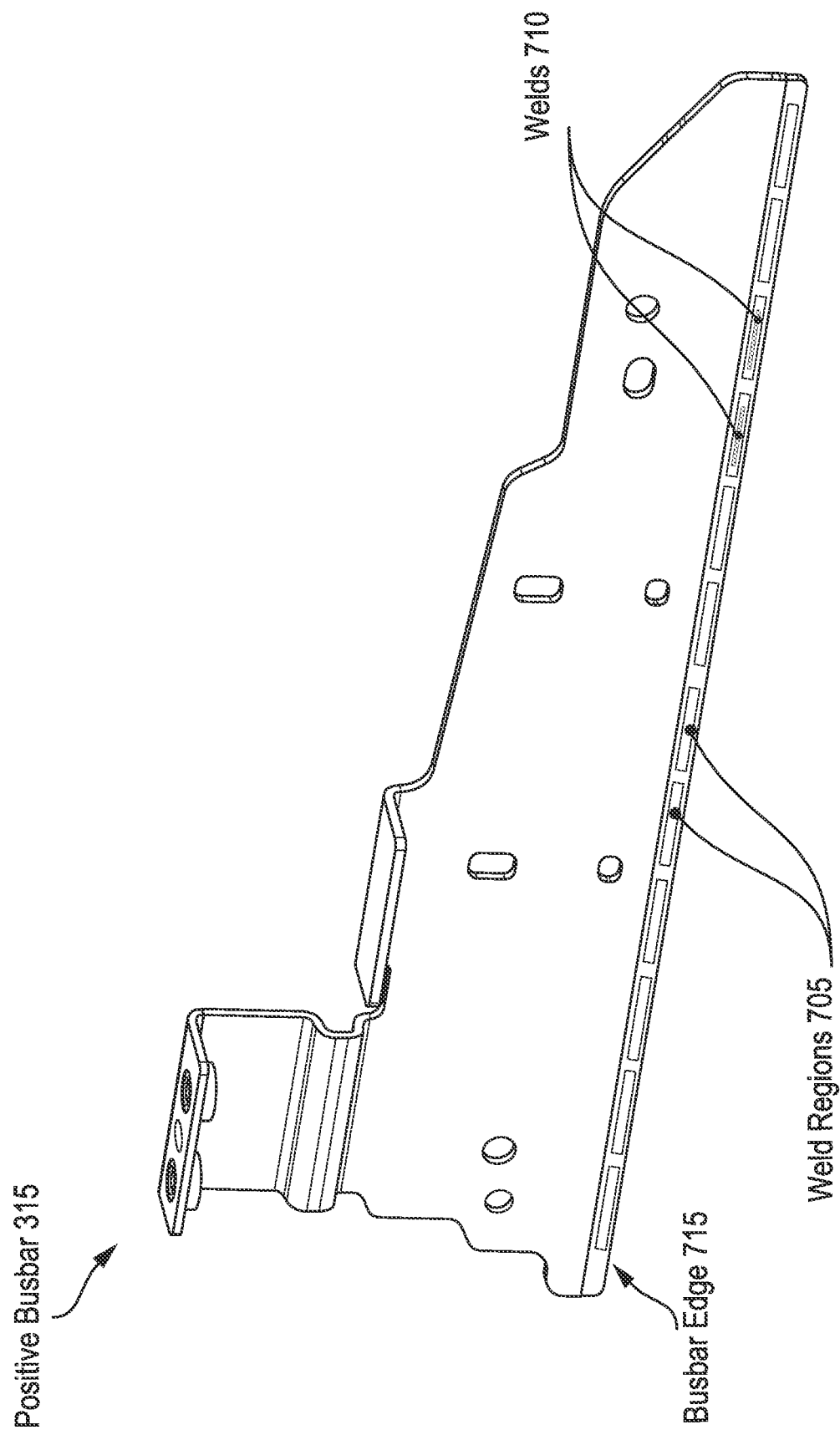
FIG. 8 depicts an example of a positive busbar.

FIG. 8 depicts a positive busbar 315 that can include a metal plate comprising an edge 715 about which interfaces 320 can be attached to the positive busbar 315. Positive busbar 315 can include a front surface that can be faced away from the tote 325 when integrated into a battery module 115. Positive busbar 315 can include a back surface that is opposite to the front surface and that is turned towards the tote 325 when the positive busbar 315 is integrated into the battery module 115. On the front surface of the positive busbar 315, one or more weld regions 705 can be disposed along and proximate to the busbar edge 715.

Any surface of the positive busbar 315 can include weld regions 705. Weld regions 705 for forming welds 710 can be disposed or located on any surface of a positive busbar 315. For example, weld regions 705 can be formed on the front surface of the positive busbar 315, such as for example the surface facing away from the tote 325. Weld regions 705 can be formed on the top surface of the positive busbar 315, such as example the surface defining the thickness of the busbar 315. Weld regions 705 can be formed on the bottom surface of the positive busbar 315, such as for example the surface defining the thickness of the busbar 315 on the opposite side of the top surface. Weld regions 705 can be lined up along the top surface, the bottom surface, a top portion of the front surface (e.g., near the top surface edge) or a bottom portion of the front surface (e.g., near a bottom surface edge) of the positive busbar 315. For example, positive busbar 315 can include one or more the weld regions 705 on a side surface (e.g., top surface or a bottom surface) of the positive busbar 315. The side surface can be defined by the thickness of the positive busbar 315, such as along with and in proximity to the busbar edge 715 extending along the side surface of the positive busbar 315. Weld regions 705 and welds 710 can be set a distance apart from the busbar edge 715. Each of the weld regions 705 can include one or more welds 710 for welding interfaces 320 with the negative the positive busbar 315. Weld regions 705 can line up the front surface of the positive busbar 315 along with and proximate to the busbar edge 715. Welds 710 can line up the front surface of the positive busbar 315 and along with and proximate to the busbar edge 715, such as inside of the weld regions 705. Welds 710 can line up the side surface of the positive busbar 315 and along with and proximate to the busbar edge 715, such as inside of the weld regions 705 on the side surface of the positive busbar 315.

Figure 9:
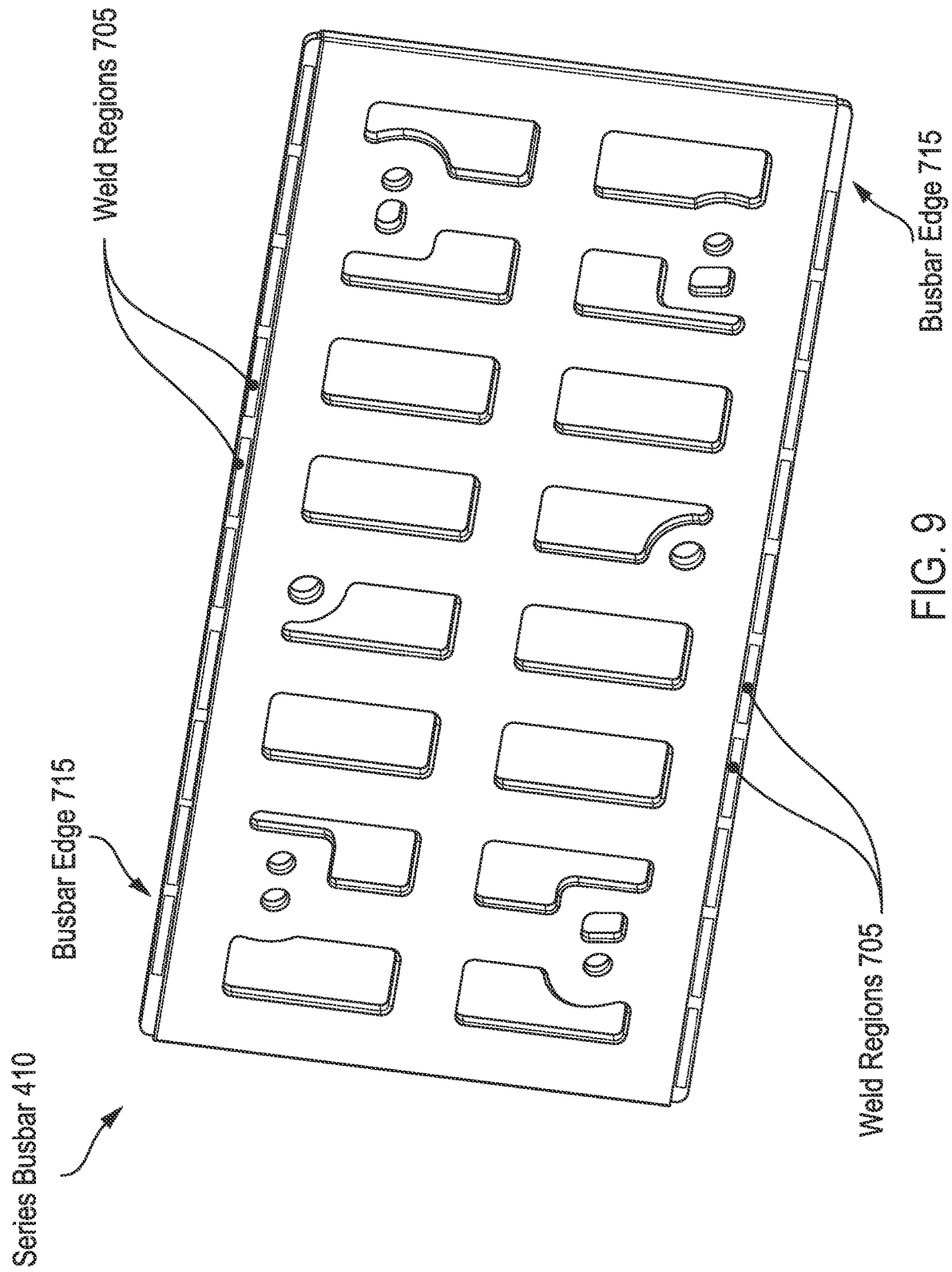
FIG. 9 depicts an example of a series busbar.

FIG. 9 depicts a series busbar 410 that can include a metal plate comprising a first busbar edge 715 about which interfaces 320 can be attached to the series busbar 410 from a negative current collector 305 and a second busbar edge 715 about which interfaces 320 can be attached to the series busbar 410 from a positive current collector 405. Series busbar 410 can include a front surface that can be faced away from the tote 325 when integrated into a battery module 115. Series busbar 410 can include a back surface that is opposite to the front surface and that is turned towards the tote 325 when the series busbar 410 is integrated into the battery module 115. On the front surface of the series busbar 410, one or more weld regions 705 can be disposed along and proximate to the first busbar edge 715. On the front surface of the series busbar 410, one or more weld regions 705 can be disposed along and proximate to the second busbar edge 715.

Any surface of the series busbar 410 can include weld regions 705. Weld regions 705 for forming welds 710 can be disposed or located on any surface of a series busbar 410. For example, weld regions 705 can be formed on the front surface of the series busbar 410, such as for example the surface facing away from the tote 325. Weld regions 705 can be formed on the top surface of the series busbar 410, such as example the surface defining the thickness of the busbar 410. Weld regions 705 can be formed on the bottom surface of the series busbar 410, such as for example the surface defining the thickness of the busbar 310 on the opposite side of the top surface. Weld regions 705 can be lined up along the top surface, the bottom surface, a top portion of the front surface (e.g., near the top surface edge) or a bottom portion of the front surface (e.g., near a bottom surface edge) of the series busbar 410. For example, series busbar 410 can include one or more the weld regions 705 on a side surface (e.g., top surface or a bottom surface) of the series busbar 410. The side surface can be defined by the thickness of the series busbar 410, such as along with and in proximity to the busbar edge 715 extending along the side surface of the series busbar 410. Weld regions 705 and welds 710 can be set a distance apart from the busbar edge 715. Each of the weld regions 705 can include one or more welds 710 for welding interfaces 320 with the series busbar 410. Weld regions 705 can line up the front surface of the series busbar 410 along with and proximate to either of the two busbar edges 715. Welds 710 can line up the front surface of the series busbar 410 and along with and proximate to either of the two the busbar edges 715, such as inside of the weld regions 705. Welds 710 can line up the side surface of the series busbar 410 and along with and proximate to the busbar edge 715, such as inside of the weld regions 705 on the side surface of the series busbar 410.

Figure 10:
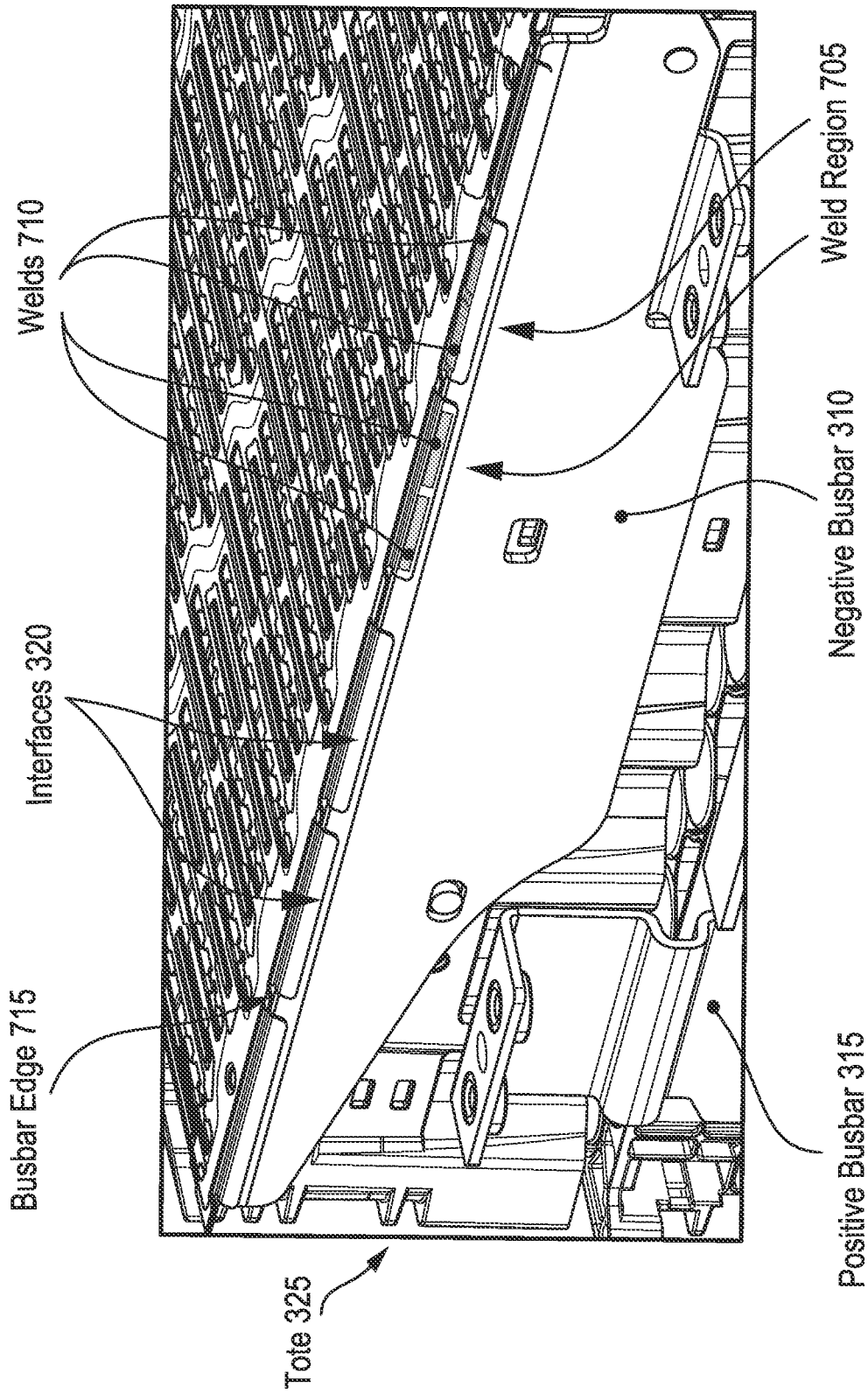
FIG. 10 depicts a perspective view of an interface in which interface components provide electrical coupling between the busbar of the battery module.

FIG. 10 depicts a plurality of interface components 320 of a battery module 115 electrically coupled with a negative busbar to a negative current collector 305. FIG. 10 illustrates a negative current collector 305 disposed or affixed on a top surface or a perimeter of the top surface of a tote 325. FIG. 10 shows interfaces 320 protruding from the negative current collector 305 and being curved or bent over busbar edge 715 of the negative busbar 310. Interfaces 320 are connected to the negative busbar 310 via welds 710 that can be implemented in weld regions 705. For example, weld regions 705 and their corresponding welds 710 can be located on the outer or front surface of the negative busbar 310, or positive busbar 315 or series busbar 410. For example, weld regions 705 and their corresponding welds 710 can be located on the top surfaces (e.g. top side surfaces) defining or corresponding to the thickness of the negative busbar 310, or positive busbar 315 or series busbar 410. As illustrated in FIG. 10, some welds 710 can be located on the front surface of the busbar (e.g., 310), while other welds 710 can be located on the top surface of the same busbar. Welds 710 can connect the bottom surfaces of the interfaces 320 with the front or outer surfaces of the negative busbar 310. Each interface 320 can be connected to a busbar, such as the negative busbar 310, via one or more welds 710, where each one or more welds can be done in one or more weld regions 705. The one or more weld regions 705 can be in electrical contact with the bottom surface of the interface 320.

Figure 11:
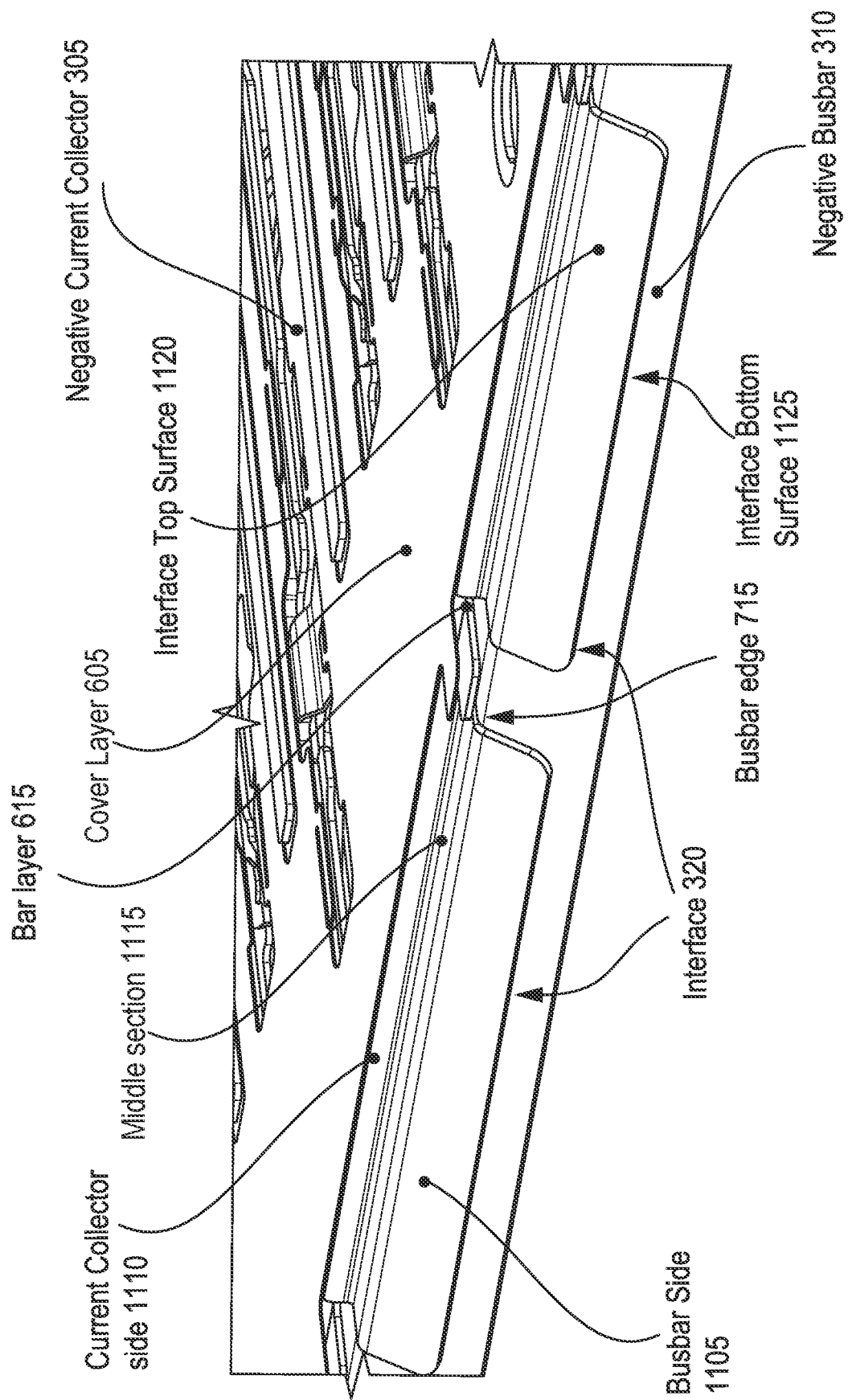
FIG. 11 depicts a zoom-in view of interface components coupling the current collector with the busbar of the battery module.

FIG. 11 depicts interface components 320 coupling the negative current collector 305 with the negative busbar 310 of the battery module 115. Negative current collector 305 can include a bar layer 615 that is covered by a cover layer 605. Interfaces 320 are shown electrically coupled to the bar layer 615. Interfaces 320 can be integral or a part of the metal sheet forming the bar layer 615 of the negative current collector 305. Interfaces 320 protrude or extend outward pass the edge of the negative current collector 305 and curve about or bend over the busbar edge 715 of the negative busbar 310 to electrically couple with the front or outer surface of the negative busbar 310.

Interface component 320 can include a busbar side 1105, a current collector side 1110 and the middle section 1115. The middle section 1115 of the interface 320 can be the portion of the interface 320 that curves about the busbar edge 715. The middle section 1115 can include a curvature about the edge and can include one or more grooves to facilitate with curving or bending the interface 320 about the busbar edge 715. The busbar side 1105 of the interface 320 can include the portion of the interface 320 that protrudes or extends away from the current collector 305 or 405 beyond the middle section 1115. The busbar side 1105 of the interface 320 can include a flat area on the bottom interface bottom surface 1125 of the interface 320. The interface bottom surface 1125 can include the area or the surface that faces the front or the outer surface of the busbar, such as the busbars 310, 315 or 410. The bottom surface 1125 can include that physically interfaces with or welds with the welds 710 in the weld regions 705. Interface top surface 1120 can include the grooves or ridges in the middle section 1115 of the interface 320 to facilitate curving or bending of the interface 320 about the busbar edge 715.

In some aspects, the present solution relates to a system 300. System 300 can include a battery, such as a battery pack 110, a battery module 115 or a battery cell 120 of an EV 105. The system 300 can include a current collector 305 or 405 of the battery (e.g., a battery pack 110, battery module 115 or battery cell 120). The system 300 can include a current collector 305 or 405 of a battery. The system 300 can include a current collector 305 or 405 of a battery. The system 300 can include a busbar 310, 315 or 410 of the battery (e.g., battery pack 110, battery module 115 or battery cell 120). The system 300 can include an interface component 320, sometimes also referred to as the interface 320 or a component 320, which can be disposed about an edge 715 of the busbar 310, 315 or 410. The interface component 320 can be electrically coupled with the current collector 305 or 405. The interface component 320 can be coupled with the busbar 310, 315 or 410 via a weld 710 between the interface component 320 and the busbar 310, 315 or 410.

The system 300 can include an edge 715 of the busbar 310, 315 or 410. The interface 320 can be in contact with the edge 715 of the busbar 310, 315 or 410. The interface 320 can be disposed about the edge 715 of the busbar 310, 315 or 410. The interface can be positioned at least partially on the edge 715 of the busbar 310, 315 or 410. The interface can be configured to bend around at least a portion of the edge 715 of the busbar 310, 315 or 410. For example, the current collector 305 or 405 can include a plurality of layers, such as cover layer 605, contact layer 610 or bar layer 615. The interface component 320 can be an integral part of an electrically conductive layer of the plurality of layers, such as layers 605, 610 or 615. The component 320 can protrude from the current collector 305 or 405 to couple with the busbar 310, 315 or 410. A part 1115 of the component 320 can be curved about, or bent over, the edge 715 of the busbar 310, 315 or 410 and a second part 1105 of the component 320 comprising a bottom surface 1125 that is welded with the busbar 310, 315 or 410. The bottom surface 1125 can extend over the bottom side of the busbar side 1105, middle section 1115 and current collector side 1110 of the interface component 320.

The system 300 can include a second interface component 320 that is curved about, or bent over, the edge 715 of the busbar 310, 315 or 410. The second component 320 can be electrically coupled with the current collector 305 or 405 and coupled with the busbar 310, 315 or 410 via a second weld 710 at a second region 705 of the busbar 310, 315 or 410. The system 300 can include the current collector 305 or 405 extending along a top surface of the battery module 115 or the battery pack 110. The system 300 can include the busbar 310, 315 or 410 extending along a side surface of the battery module 115 or the battery pack 110. The system 300 can include the interface component 320 forming a corner about the edge 715 of the busbar 310, 315 or 410. The interface component 320 can be integrated into a layer, such as 605, 610 or 615, of a plurality of layers of the current collector 305 or 405 of the battery module 115 or the battery pack 110.

The system 300 can include a battery pack 110 comprising the battery (e.g., battery module 115 or battery cell 120). The system 300 can include a second battery (e.g., battery module 115 or battery cell 120) of the battery pack 110. The system 300 can include the battery module 115 and a second battery module 115 of the battery pack 110. The system 300 can include the battery cell 120 and a second battery cell 120. The second battery can include a second busbar 310, 315 or 410 of the second battery that is electrically coupled with the busbar 310, 315 or 410 of the battery. The second battery can include a second interface 320 of the second battery (e.g., second battery module 115 or second battery cell 120) that can be disposed about a second edge 715 of the second busbar 310, 315 or 410 of the second battery. The interface 320 of the second battery can be electrically coupled with the second current collector 305 or 405 of the second battery. The interface 320 of the second battery can be coupled with the second busbar 310, 315 or 410 of the second battery via a second weld 710 between the second interface and the second busbar of the second battery.

The system 300 can include a battery pack 110 that can include a busbar 310, 315 or 410 of the second battery module 115 that is electrically coupled with the busbar 310, 315 or 410 of the battery module 115. The second battery module 115 can include an interface component 320 of the second battery module 115 disposed about an edge 715 of the busbar 310, 315 or 410 of the second battery module 115. The component 320 of the second battery module 115 can be electrically coupled with a current collector 305 or 405 of the second battery module 115 and coupled with the busbar 310, 315 or 410 of the second battery module 115 via a second weld 710 between the component 320 and the busbar 310, 315 or 410 of the second battery module 115.

The system 300 can include a second current collector 305 or 405 of the battery module 115, a second busbar 310, 315 or 410 of the battery module 115 and a second interface component 320 disposed about an edge 715 of the second busbar 310, 315 or 410. The second component 320 can be electrically coupled with the second current collector 305 or 405 and coupled with the second busbar 310, 315 or 410 via a second weld 710 between the second component 320 and the second busbar 310, 315 or 410.

The system 300 can include the current collector 305 that is a negative current collector of the battery module 115 and the busbar 310 that is a negative busbar of the battery module 115. The system 300 can include the current collector 405 that is a positive current collector of the battery module 115 and the busbar 315 that is a positive busbar of the battery module 115. The negative current collector 305 or the negative busbar 310 can be configured to operate at a negative voltage potential with respect to the positive current collector 405 or positive busbar 315.

The system 300 can include the component 320 comprising a sheet of electrical conductor material, such as aluminum or copper. Interface component 320 can be curved or bent to form a corner about an edge of the battery module 115 or the tote 325. The interface component 320 can attach to and electrically couple an end of the current collector 305 or 405 and an end of the busbar 310, 315 or 410. The component 320 can attach and couple the end of the current collector 305 or 405 to, or with, an end of the busbar 310, 315 or 410.

The system 300 can include a middle portion 1115 between a first part 1105 of the component 320 that couples with the region 705 at a top surface of the busbar 310, 315 or 410 and a second part, such as the current collector side 1110 of the component 320, that couples with a second region, such as a region 705, on or at a top surface of a metal layer (e.g., 610 or 615) of the current collector 305 or 405.

The system can include a first weld region 705 between a bottom surface 1125 of the component 320 and the busbar 310, 315 or 410, and a second weld region 705 between the bottom surface 1125 of the component 320 and the current collector 305 or 405. The first and second weld regions 705 can include first and second welds 710 that create electrical and physical coupling between the component 320 and the current collector 305 or 405 and between the component 320 and the busbar 310, 315 or 415.

The system 300 can include the interface component 320 that is a portion of a metal layer of a plurality of layers, such as 605, 610 or 615 of the current collector 305 or 405. The component 320 can have thickness that is less than 500 micrometers. The region 705 of the busbar 310, 315 or 415 to which the component 320 attaches, contacts or couples can include a flat surface that is less than 3 mm wide. In some instances, the component 320 can be a part of the metal sheet forming the bar layer 615, where the component 320 and the bar layer comprises a thickness of about 400 micrometers and the region 705 can be about 2 millimeters wide and more than 2 millimeters long, such as 5 millimeters, 10 millimeters, 15 millimeters, 20 millimeters, 30 millimeters or more than 30 millimeters.

The system 300 can include a thickness of the component 320 and a thickness of a layer (e.g., 610 or 615) of the current collector 305 or 405, to which the component 320 electrically couples, which are less than the thickness of the busbar 310, 315 or 415. The system 300 can include weld 710 that can be elongate and shaped as a line of weld at a region 705 on one of an outer surface of the busbar 310, 315 or 410 or the side surface of the busbar 310, 315 or 410 sharing an edge with the outer surface. The line of the weld 710 can be overlapped by a portion of the component 320. An inner surface of the busbar 310, 315 or 410 can be opposite to the outer surface of the busbar and facing one or more battery cells 120 of the battery module 115. The system can include a first line of the weld 710 on the busbar 310, 315 or 410 and in contact with a first side 1105 of the component 320 and a second line of a second weld 710 on the busbar 310, 315 or 410 and in contact with the first side 1105 of the component 320.

The present solution relates to an electric vehicle 105. Electric vehicle 105 can include a current collector 305 or 405 of a battery, such as a battery pack 110, battery module 115 or a battery cell 1120. Electric vehicle 105 can include a busbar 310, 315 or 410 of the battery and an interface 320. The interface 320 can be electrically coupled with the current collector 305 or 405. The interface 320 can be coupled with the busbar 310, 315 or 410 via a weld 710 between the interface 320 and the busbar 310, 315 or 410. Electric vehicle 105 can include an edge of the busbar 310, 315 or 410. The interface 320 can be in contact with the edge 715 of the busbar 310, 315 or 410. The interface 320 can be bent around the edge 715 to couple with the busbar 310, 315 or 410.

Electric vehicle 105 can include a first interface component 320 and a second interface component 320. The first component 320 of the battery module 115 can be curved about an edge 715 of the busbar 310, 315 or 410 to electrically couple a layer (e.g., 610 or 615) of the current collector 305 or 405 with the busbar 310, 315 or 410. The first component 320 can be coupled with the busbar 310, 315 or 410 via a first weld 710 at a first region 705 of the busbar 310, 315 or 410. The second component 320 can be curved about the edge 715 of the busbar 310, 315 or 410 to electrically couple the layer (e.g., 610 or 615) of the current collector 305 or 405 with the busbar 310, 315 or 410. The second component 320 can be coupled with the busbar 310, 315 or 410 via a second weld 710 at a second region 705 of the busbar 310, 315 or 410.

The present solution can include a battery pack 110 that can include a battery module 115 and a second battery module 115. The second battery module 115 of the battery pack 110 can include a busbar 310, 315 or 410 of the second battery module 115 that electrically couples with the current collector 305 or 405 of the second battery module 115 via a first component 320 of the second battery module 115 curved about an edge of the busbar 310, 315 or 410 of the second battery module 115 to electrically couple a layer (e.g., 610 or 615) of a current collector 305 or 405 of the second battery module 115 with the busbar 310, 315 or 410 of the second battery module 115. A second component 320 of the second battery module 115 curved about the edge 715 of the busbar 310, 315 or 410 of the second battery module 115 to electrically couple the layer (e.g., 610 or 615) of the current collector 305 or 405 of the second battery module 115 and with the busbar 310, 315 or 410 of the second battery module 115.

Figure 12:
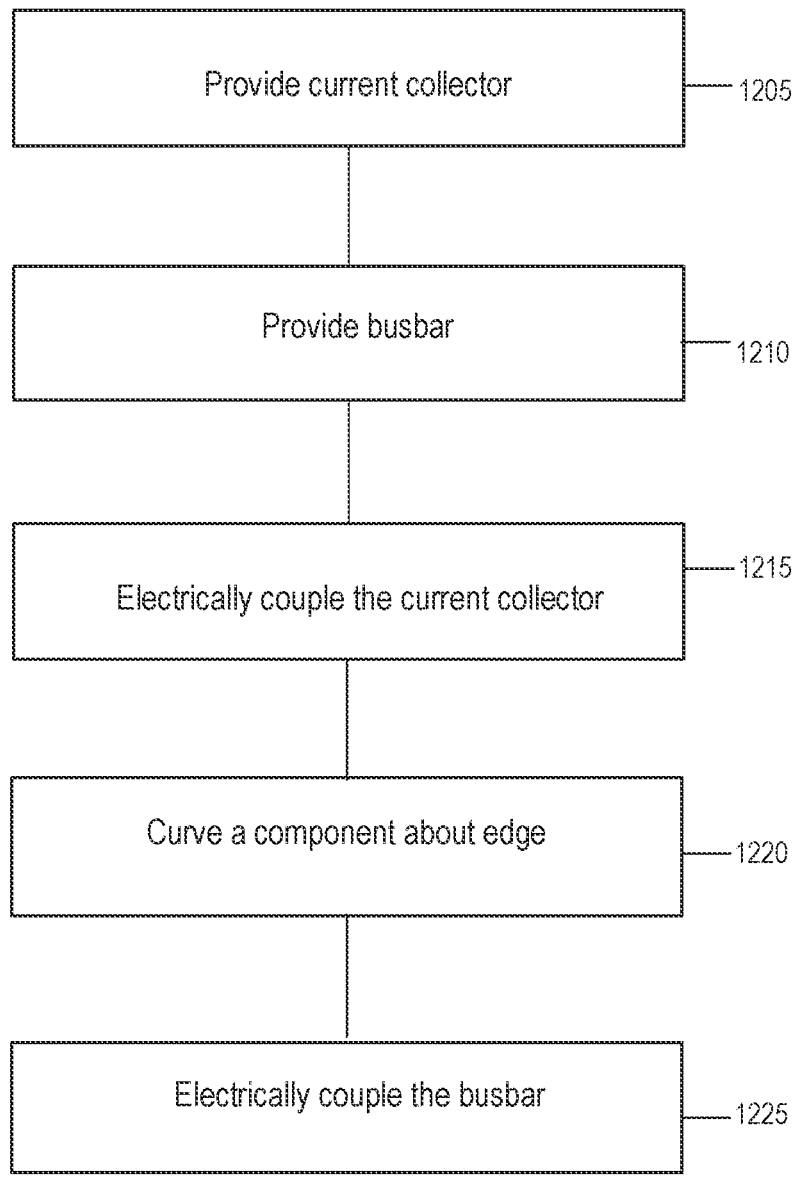
FIG. 12 is a flow diagram illustrating an example method of electrically coupling a current collector with a busbar of battery module.

FIG. 12 depicts a method 1200 of providing, manufacturing or using electrical coupling between a busbar and a current collector of a battery module. The method 1200 can be performed by or via a system 300, a battery module 115, a battery pack 110 or an EV 105, for example. In brief overview, the method 1200 can include providing a current collector at ACT 1205. At ACT 1210, the method 1200 can include providing a busbar. At ACT 1215, the method 1200 can include electrically coupling the current collector. At act 1220, the method 1200 can include curving a component about an edge. At ACT 1225, the method 1200 can include electrically coupling the busbar.

At ACT 1205, the method 1200 can include providing a current collector. The current collector can be a current collector of a battery, such as a battery pack, battery module or a battery cell. The method can provide a current collector on a top side of a battery module. The current collector can be supported on a top surface of a tote of a battery module. The method can provide a second current collector on a bottom side of a battery module. The current collector on the bottom side can be supported on a bottom surface of the tote of the battery module.

The current collector can include one or more electrically conductive layers, such as a bar layer, a contact layer and a cover layer. The cover layer can be an electrically insulative layer, comprising electrical insulator, such as plastic, rubber, or other electrically insulating material. The layers of the current collector, such as the bar and contact layers, can include sheets of metal that can be electrically coupled with each other. The electrically conductive layers can include copper, aluminum, silver, gold or any other electrical conductor. Current collector can include a bar layer that is between 200 micrometers and 1000 micrometers thick, such as more than 300 micrometers, 400 micrometers, 500 micrometers or 600 micrometers thick. The current collector can span the top surface of the battery module tote. The battery module can be included in a battery pack. The battery pack can include a plurality of battery modules that can have their respective positive, negative or series busbars. The busbars of different battery modules can be connected in series or parallel electrical configurations with other busbars of the battery modules of the battery pack.

At ACT 1210, the method 1200 can include providing a busbar. The busbar can be a busbar of a battery, such as a battery pack, battery module or a battery cell. The method can provide a busbar on a side of the battery module abutting the top side. The busbar can be supported on an outer surface of the tote of the battery module. The busbar can be one or more of a positive busbar, a negative busbar or a series busbar. The method can provide a second busbar on a second side of the battery module abutting the bottom side. The second busbar can be a positive busbar, a negative busbar or a series busbar. The first busbar can be a negative busbar and the second busbar can be a series busbar, and vice versa. The first busbar can be a positive busbar and the second busbar can be a series busbar, and vice versa. The first busbar can be a positive busbar and the second busbar can be a negative busbar, and vice versa.

At ACT 1215, the method 1200 can include electrically coupling the current collector. The method can include providing an interface. The interface can be electrically coupled with the current collector. The interface can be coupled with the busbar via a weld between the interface and the busbar. The method can include electrically coupling a first part of a component, also referred to as an interface or an interface component, with the current collector. The method can include physically or electrically coupling a first part of a second component (e.g., a second interface connector) with the second current collector. The current collector can be coupled to the interface component such that the component is an integral part of an electrically conductive layer of the current collector. For example, the current collector can include a bar layer comprising a sheet of metal, such as copper or aluminum. The interface component can be a tab of the sheet of metal that protrudes from the bar layer of the current collector, thereby maintaining electrical and physical coupling with the bar layer and the current collector. The interface component can electrically couple to the current collector by one or more welds that can be applied or implemented between a current collector side of the interface component and one or more weld regions that can be formed at the bar layer, or the contact layer, of the current collector.

At ACT 1220, the method 1200 can include curving the interface component about an edge. The method can provide an edge of the busbar. The interface can be in contact with and disposed about the edge of the busbar. The method can include bending or curving the interface component about an edge of the busbar. The method can include providing a bent or curved interface component, such that the bent or curved component fits or envelopes about or around the edge of the busbar. The method can provide an edge of the busbar, such that interface is positioned at least partially on the edge of the busbar. The interface can be configured to bend around at least a portion of the edge of the busbar. For example, the interface component can be curved or bent over an edge of a busbar so that the busbar side of the interface component overlaps one or more weld regions on a front or outer surface of the busbar. The method can include curving a second interface component about an edge of the second busbar. The second interface component can be same or similar as the first interface component and can connect or electrically couple with the same current collector. The second interface component can electrically couple with a different current collector. The method can include bending or curving a second interface component coupled with the current collector about the edge of the busbar, or providing a curved or bent second interface component that fits or envelopes about the edge of the busbar. For example, the second interface component can be curved about the same edge about which the first component was curved. The second interface component can electrically couple with the same current collector and the same busbar as the first interface component. The method can include curving a second interface component about an edge of the second busbar.

At ACT 1225, the method 1200 can include electrically coupling the busbar. The method can include electrically coupling a second part of the interface component via a first weld with a first region of the busbar. For example, one or more lines of welding can be applied to weld and physically or electrically couple the busbar side of the interface component with the weld regions of the busbar. The method can include electrically coupling a second part of the second interface component with the second busbar. The method can include electrically coupling a first part of the second component via a second weld at a second region of the busbar. The method can include electrically coupling a first part of the second component via a second weld at a second region of the second busbar. The second component can be electrically coupled with a second current collector of the second battery module. A battery pack can include two or more battery modules in which busbar of a first battery module can electrically couple with the busbar of another battery module of the battery pack. The two electrically coupled battery modules can be connected in series or in parallel with each other or with other battery modules in the battery pack.

The method can include providing a battery pack comprising the battery. The battery can include one or more battery modules. The battery can include one or more battery cells. The method can include providing a second battery of the battery pack comprising a second busbar of the second battery (e.g., a second one or more battery modules or a second one or more battery cells). The second busbar of the second battery can be electrically coupled with the busbar of the battery. The second battery can include a second interface of the second battery disposed about a second edge of the second busbar of the second battery. The interface of the second battery can be electrically coupled with a second current collector of the second battery. The interface of the second battery can be coupled with the second busbar of the second battery via a second weld between the second interface and the second busbar of the second battery.

This present application is related to a co-pending application titled "Interface for Integrating a Current Collector into a Battery Assembly" filed concurrently with the present application and identified by U.S. application Ser. No. 18/067,769 and a co-pending application titled "Busbar Integrated with a Tote of a Battery Assembly" filed concurrently with the present application and identified by U.S. application Ser. No. 18/067,768, both of which are incorporated by reference herewith in their entirety and for all purposes.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, negative busbar and a positive busbar can be reversed, as well as negative current collector and the positive current collector. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a current collector of a battery, the current collector comprising a plurality of layers;
a busbar of the battery; and
an interface disposed about an edge of the busbar, the interface comprising a portion of a layer of the plurality of layers of the current collector, wherein the portion of the layer of the interface protrudes past the plurality of layers and a surface of the busbar to couple with the busbar via a weld on the surface of the portion of the layer.

2. The system of claim 1, wherein the portion of the layer comprises an electric conductor material and forms a tab protruding past an edge of a battery and the interface is in contact with the edge of the busbar.

3. The system of claim 1, wherein the interface is welded onto the surface of the busbar abutting the edge.

4. The system of claim 1, wherein the interface is positioned at least partially on the edge of the busbar, and the interface is configured to bend around at least a portion of the edge of the busbar.

5. The system of claim 1, comprising:
the plurality of layers comprising the layer in electrical contact with a second layer configured to provide electrical contact with a plurality of battery cells, the plurality of layers comprising a third layer to cover the second layer, wherein the interface protrudes past the plurality of layers of the current collector to couple with the busbar;
a part of the interface bent over the edge of the busbar; and
a second part of the interface comprising the surface that is welded with the busbar.

6. The system of claim 1, comprising:
the current collector configured to extend along a top surface of the battery;
the busbar configured to extend along a side surface of the battery; and
the interface configured to form a corner about the edge of the busbar, the interface integrated into the layer of a plurality of layers of the current collector of the battery.

7. The system of claim 1, comprising:
a battery pack comprising the battery; and
a second battery of the battery pack comprising a second busbar of the second battery that is electrically coupled with the busbar of the battery,
wherein the second battery comprises a second interface of the second battery disposed about a second edge of the second busbar of the second battery, the interface of the second battery electrically coupled with a second current collector of the second battery and coupled with the second busbar of the second battery via a second weld between the second interface and the second busbar of the second battery.

8. The system of claim 1, comprising:
a second current collector of the battery;
a second busbar of the battery; and
a second interface disposed about a second edge of the second busbar, the second interface electrically coupled with the second current collector and coupled with the second busbar via a second weld between the second interface and the second busbar.

9. The system of claim 1, wherein the current collector is a negative current collector of the battery and the busbar is a negative busbar.

10. The system of claim 1, wherein the interface comprises a sheet of electrical conductor material that is bent to form a corner, and wherein the interface electrically couples an end of the current collector with an end of the busbar.

11. A method, comprising:
providing a current collector of a battery, the current collector comprising a plurality of layers;
providing a busbar of the battery; and
providing an interface disposed about an edge of the busbar, the interface comprising a portion of a layer of the plurality of layers of the current collector, wherein the portion of the layer of the interface protrudes past the plurality of layers and a surface of the busbar to couple with the busbar via a weld on the surface of the portion of the layer.

12. The method of claim 11, wherein the portion of the layer comprises an electric conductor material and forms a tab protruding past an edge of a battery and the interface is in contact with the edge of the busbar.

13. The method of claim 11, comprising:
welding the interface on the surface of the busbar abutting the edge of the busbar.

14. The method of claim 11, wherein the interface is positioned at least partially on the edge of the busbar, and the interface is configured to bend around at least a portion of the edge of the busbar.

15. The method of claim 11, comprising:
providing the plurality of layers comprising the layer in electrical contact with a second layer configured to provide electrical contact with a plurality of battery cells, the plurality of layers comprising a third layer to cover the second layer, the interface protruding from the current collector to couple with the busbar;
providing a part of the interface bent over the edge of the busbar; and
providing a second part of the interface comprising the surface that is welded with the busbar.

16. The method of claim 11, comprising:
providing the current collector configured to extend along a top surface of the battery;
providing the busbar configured to extend along a side surface of the battery; and
providing the interface configured to form a corner about the edge of the busbar, the interface integrated into the layer of a plurality of layers of the current collector of the battery.

17. The method of claim 11, comprising:
providing a battery pack comprising the battery; and
providing a second battery of the battery pack comprising a second busbar of the second battery that is electrically coupled with the busbar of the battery,
wherein the second battery comprises a second interface of the second battery disposed about a second edge of the second busbar of the second battery, the interface of the second battery electrically coupled with a second current collector of the second battery and coupled with the second busbar of the second battery via a second weld between the second interface and the second busbar of the second battery.

18. The method of claim 11, comprising:
providing a second current collector of the battery;
providing a second busbar of the battery; and
providing a second interface disposed about a second edge of the second busbar, the second interface electrically coupled with the second current collector and coupled with the second busbar via a second weld between the second interface and the second busbar.

19. An electric vehicle, comprising:
a current collector of a battery, the current collector comprising a plurality of layers;
a busbar of the battery; and
an interface disposed about an edge of the busbar, the interface comprising a portion of a layer of the plurality of layers of the current collector, wherein the portion of the layer of the interface protrudes past the plurality of layers and a surface of the busbar to couple with the busbar via a weld on the surface of the portion of the layer.

20. The electric vehicle of claim 19, wherein the portion of the layer comprises an electric conductor material and forms a tab protruding past an edge of a battery and the interface is in contact with the edge of the busbar.

\* \* \* \* \*